US011927160B2

(12) United States Patent
Zock et al.

(10) Patent No.: US 11,927,160 B2
(45) Date of Patent: Mar. 12, 2024

(54) SYSTEM FOR ENHANCING PERFORMANCE OF CARBURETOR ENGINE AND PERIPHERALS OF AN ALL-TERRAIN VEHICLE

(71) Applicants: Miles John Zock, Lapeer, MI (US); Richard Mellick Zock, Metamora, MI (US)

(72) Inventors: Miles John Zock, Lapeer, MI (US); Richard Mellick Zock, Metamora, MI (US)

(73) Assignee: Zoom Zoom Parts LLC, Lapeer, MI (US)

( * ) Notice: Subject to any disclaimer, the term of this patent is extended or adjusted under 35 U.S.C. 154(b) by 59 days.

(21) Appl. No.: 17/645,598

(22) Filed: Dec. 22, 2021

(65) Prior Publication Data

US 2022/0186690 A1 Jun. 16, 2022

Related U.S. Application Data

(62) Division of application No. 17/247,052, filed on Nov. 25, 2020, now Pat. No. 11,624,343.

(60) Provisional application No. 62/975,454, filed on Feb. 12, 2020, provisional application No. 62/961,928, filed on Jan. 16, 2020, provisional application No. 62/939,968, filed on Nov. 25, 2019, provisional application No. 62/939,914, filed on Nov. 25, 2019, provisional application No. 62/939,923, filed on Nov. 25, 2019, provisional application No. 62/939,951, filed on Nov. 25, 2019, provisional application No. 62/939,947, filed on Nov. 25, 2019, provisional application No. 62/939,963, filed on Nov. 25, 2019.

(51) Int. Cl.
*F02M 35/10* (2006.01)

(52) U.S. Cl.
CPC ................. *F02M 35/10327* (2013.01); *F02M 35/10196* (2013.01); *F02M 35/10275* (2013.01); *F02M 35/10078* (2013.01)

(58) Field of Classification Search
CPC ....... F02M 35/10078; F02M 35/10275; F02M 35/10327
See application file for complete search history.

(56) References Cited

PUBLICATIONS https://www.amazon.com/uxcell-a16121600ux0599-Motorcycle-Tachometer-Guage/dp/B0725DJV4H, "uxcell Universal LED Backlight Motorcycle Tachometer Speedometer Odometer Gauge Set Replacement", uxcell store, May 17, 2017 (Year: 2017).*

* cited by examiner

*Primary Examiner* — Kevin A Lathers
(74) *Attorney, Agent, or Firm* — Dunlap Bennett & Ludwig, PLLC

(57) ABSTRACT

A mounting bracket for a handlebar of a discontinued All-Terrain Vehicle (ATV) is provided. The mounting bracket includes a U-shape body, wherein a lower portion of both legs of the U-shape body are tilted at an approximately thirty-degree degree angle relative to a remaining portion of the mounting bracket; and a plurality of mounting holes only provided along said lower portions.

5 Claims, 29 Drawing Sheets

SYSTEM FOR ENHANCING PERFORMANCE OF CARBURETOR ENGINE AND PERIPHERALS OF AN ALL-TERRAIN VEHICLE

CROSS-REFERENCE TO RELATED APPLICATION

This application claims the benefit of priority of U.S. provisional applications: No. 62/939,914 filed 25 Nov. 2019; No. 62/939,923 filed 25 Nov. 2019; No. 62/939,947 filed 25 Nov. 2019; No. 62/939,951 filed 25 Nov. 2019; No. 62/939,963 filed 25 Nov. 2019; No. 62/939,968 filed 25 Nov. 2019; No. 62/961,928 filed 16 Jan. 2020; and No. 62/975,454 filed 12 Feb. 2020 the contents of which are herein incorporated by reference. This application claims the benefit of priority of U.S. Non-Provisional application Ser. No. 17/247,052 filed 25 Nov. 2020, as a divisional thereof, the contents of which are herein incorporated by reference.

BACKGROUND OF THE INVENTION

The present invention relates to a system for enhancing performance of a carburetor engine and peripherals of an all-terrain vehicle and, more particularly, a modified carburetor and intake manifold assembly for All-Terrain Vehicles or Quad Bikes (hereafter, "ATV/QUAD"). In certain embodiments, the aluminum intake manifold incorporates a pressure relief valve and gasket adapted to replace the original equipment manufacturer (OEM) or aftermarket intake manifolds that breaks down.

Furthermore, the present invention relates to engine mounting brackets for ATV/QUAD machines, wherein an oil cooler and front bumper can be mounted to the engine mounting brackets.

Additionally, the present invention relates to a tachometer mounting bracket for the ATV/QUAD machines.

Moreover, the present invention discloses transparent cover lids for the carburetor engine and associated parts, thereby enabling immediate visual inspection of these components as well as the motor oil and air vent operative conditions.

The present invention further relates to a replacement carburetor air fuel mixture rich/lean screws for OEM carburetor engine.

The ATV/Quad machine contemplated herein may include but is not limited to a 1987-2004 Yamaha warrior YFM 350.

Intake manifolds of carburetor engines, generally, are at risk of failure due to the buildup of internal pressure in the motor. As a result, satisfactorily replacing a failed intake manifold is critical to the engine's future performance, particularly for the high-performance engines of ATV/QUAD machines, such as the 1987-2004 Yamaha warrior YFM 350.

As can be seen, there is a need for a modified carburetor and intake assembly and a method of replacing the same. Especially for ATV/QUAD machines such as 1987-2004 Yamaha warrior YFM 350, wherein the present invention contemplates a FCR 39 mm carburetor and rubber and aluminum intake manifold assembly.

The present invention replaces the existing original equipment manufacturer (OEM) parts, enabling the motor to perform better under any circumstance. The carburetor intake manifold assembly of the present invention allows a larger amount of air and fuel to be delivered to the combustion chamber of the motor, facilitating more reliable power.

As mentioned above, intake manifolds of carburetor engines are prone to failure due to the buildup of internal pressure in the motor. When pressure is released back into the intake manifold, the pressure is trapped between the butterfly valve of the carburetor and the closed valve from the motor. The gases trapped therein are already heated and expanded, urging the intake manifold to fail under pressure. Moreover, current intake manifolds are rubber which tends to fail under such internal pressures. Furthermore, existing intakes are designed for one-time use, and so cannot they be rebuilt or repaired properly.

As also can be seen, there is a need for an aluminum intake manifold with a pressure relief valve and a gasket adapted to replace the OEM or aftermarket intake manifold component for high performance ATV/QUADs, such as but not limited to the 1987-2004 Yamaha Warrior YFM350 machines.

The present invention is adapted so that internal pressure is released, while aluminum design stays strong enough to not fail. Specifically, the intake manifold is made from aluminum with a pressure relief valve, adapted to release the pressure in order to prevent failure.

Current top engine mounts become weak and brittle and then fail because the motor that they secure produces a lot of torque, putting the mounting brackets under a lot of stress. In short, the material currently being used by engine mounts cannot withstand that amount of stress for long periods.

As can be seen, there is a need for aluminum top engine mounting brackets designed for ATV/QUAD machines, wherein the mounting brackets are three times thicker, three times stronger and last three times longer compared to current engine mounting brackets, thereby maintaining the motor's stability for longer than the prior art.

Additionally, being able to mount an oil cooler and front bumper on an ATV/QUAD machine is currently suboptimal. Current oil coolers and associated mount brackets are not adapted to maximum air flow to the oil cooler because they interrupt air flow. Put simply, current mount brackets embody built-in obsolescence: purposefully designed to be weak in order to fail after simple usage.

As can be seen, there is a need for a bracket for mounting an oil cooler and front bumper, wherein the aluminum mounting brackets enable a free-flowing system with no interruption in air flow, maximizing the amount of air flow for cooling the oil faster, which is better for the engine.

Some ATV/QUAD machines, including but not limited to the Yamaha Warrior YFM350, have been discontinued though remain popular with enthusiasts of off-road machine adventure. However, these discontinued ATV/QUAD machines did not come with a tachometer or revolution counter, to the chagrin of its current riders. Furthermore, current retrofittable tachometers or revolution counters for ATV/QUAD machines are not as readable or clear. Additionally, they are also a universal fit device and so are not easily attached to discontinued machines. In short, the current tachometers or revolution counters are not made for discontinued configurations and so when retrofitted thereto, they either do not fit or are not readily visible accessible.

As can be seen, there is a need for a tachometer with mounting brackets dimensioned and adapted for discontinued ATV/QUAD machines. The tachometer and bracketing system embodied in the present invention is specifically redesigned and rewired to fit and work on discontinued ATV/QUAD machines, such as but not limited to a 1987-

2004 Yamaha warrior YFM350 without the need to splice wires. The mounting bracket facilitates fitting the existing wires and components properly, as well as making the present invention adapted to be reconfigured (adjustable) to the riders' needs as well as the different specifications on the ATV/QUAD machine. As a result, the present invention solves the issue and meets customers' demand.

Being able to see the operative conditions of the air filter and the motor oil along with the moving parts of the motor is advantageous because visual inspections is the first step in diagnosis of automotive issues. Thus, a system where the moving parts and other operative aspects of the engine of an ATV/QUAD machine would no longer require the removal of any cover would be a boon. Current valve cylinder heads, unfortunately, are opaque, and therefore cannot be seen through.

As can be seen, there is a need for transparent covers and lids for valve cylinder heads, cylinder head camshafts and air boxes. Additionally, such covers and lids may be lit by LED or other light-outputting devices by way of an electrical system. With these installed, a user can clearly see the condition of the moving parts and the condition of its lubricants to determine if there is need for cleaning or replacement.

In a carburetor, the fuel and air mixture is too rich when it has an excess of fuel, and too lean when there is not enough. The mixture is adjusted by a screw on ATV carburetors. Currently, adjustments to the air fuel mixture requires a separate tool, like a screwdriver, to adjust said screw of air fuel mixture component. Notably, it is very hard to reach the screw under the carburetor of the three major carburetor engines styles: Yamaha, Honda, and Polaris.

As can be seen, there is a need for a replacement carburetor air fuel mixture rich/lean screw for OEM and replacement carburetor engines parts. The rich/lean screw may include a spring, washer and O-ring operatively associated with each other in such a way as to adjust the air mixture screw by hand without a screwdriver.

The rich/lean screw may be dimensioned with a longer stem and adapted with an easy grip knob which is numbered for operable associations with the air fuel mixture component of the three major carburetor engines styles: Yamaha, Honda, and Polaris.

SUMMARY OF THE INVENTION

In one aspect of the present invention, an intake manifold assembly for an All-Terrain Vehicle (ATV), the intake manifold assembly includes the following: a metallic intake manifold operatively associated with a cylinder head; a rubber coupler circumscribing the metallic intake manifold; and a rubber S-shaped intake manifold fluidly coupling a carburetor to an air box, wherein the metallic intake manifold supports the carburetor by a connection between the rubber coupler and the rubber S-shaped intake manifold, wherein the metallic intake manifold is made of aluminum, and wherein the metallic intake manifold provides a holding ridge spaced apart from the cylinder head, wherein the holding ridge connects to a first opening of the rubber coupler, wherein a second opening of rubber coupler connects to the rubber S-shaped intake manifold, and wherein the second opening points downward relative to the first opening; an output port flange radially extending at an output end of the metallic intake manifold; a gasket coextensive with the output port flange, the gasket interconnecting the metallic intake manifold to the cylinder head; a valve point between the output end and an input end of the metallic intake manifold; an input port flange radially extending at the output end of the metallic intake manifold, wherein the input port flange and the output port flange are both eye-shaped and radially offset by approximately 45 degrees relative each other, wherein a peripheral midpoint of each port flange are continuous with a circumference of the metallic intake manifold, and wherein the valve point is between said peripheral midpoints; a pressure relief valve operatively associated with the valve point in such a way as to fluidly connect to a bore of the metallic intake manifold; a pressure relief valve operatively associated with the valve point in such a way as to fluidly connect to a bore of the metallic intake manifold.

In another aspect of the present invention, a pair of engine mounting brackets for an ATV, each engine mounting backet includes the following: a first portion having a mitten shape; a hole in a fingertip portion of the mitten shape; a hole in a thumb portion of the mitten shape; a second portion parallel to the first portion; a middle portion interconnecting the first portion and the second portion at first and second interfaces, respectively, the middle portion being oriented transversely relative to the first and second portions wherein the first portion and the second portion are parallel to each other; and a middle hole in the middle portion just downward of the first interface, wherein the first portion, the second portion, the holes of the first portion and the middle hole being mirror images of each other relative to each engine mounting bracket of the pair of mounting brackets though not the middle portions; a barbed fitting is dimensioned and adapted to fit and secure an oil line/hose; and the barbed fitting having a threaded end and a tiered end.

In yet another aspect of the present invention, A mounting bracket for a handlebar of a discontinued ATV, the mounting bracket includes the following: a U-shape body, wherein a lower portion of both legs of the U-shape body are tilted at an approximately thirty-degree degree angle relative to a remaining portion of the mounting bracket; and a plurality of mounting holes only provided along said lower portions.

In yet another aspect of the present invention, a system for facilitating a visual inspection of an ATV, the system includes the following: a transparent air box cover; and an electrical system outputting light from the air box cover lid; a transparent intake/inlet valve cover lid; a transparent exhaust/outlet valve cover lid; and a transparent cylinder head cover lid.

In yet another aspect of the present invention, carburetor air fuel mixture screw includes the following: a stem ending in a shank; a thread portion along the stem adjacent the shank; a spring slid over the shank; and a O-ring, wherein the spring and the O-ring are dimension so that a circumference of the spring slides in an air fuel mixture opening of a carburetor, and wherein the O-ring seals said air fuel mixture opening; a stop along the stem seating the O-ring; and a washer along the stem above the threaded portion, seating the spring.

These and other features, aspects and advantages of the present invention will become better understood with reference to the following drawings, description and claims.

DETAILED DESCRIPTION OF THE INVENTION

Figure 1:
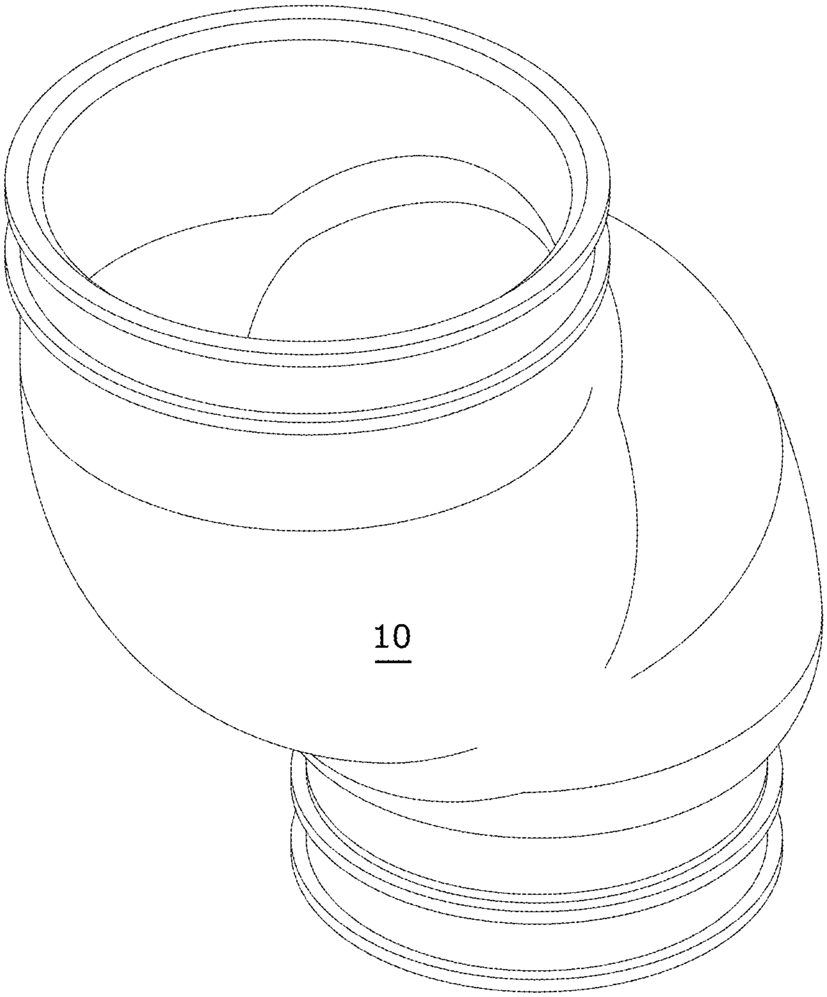
FIG. 1 is a perspective view of an exemplary embodiment of the present invention.
Figure 2:
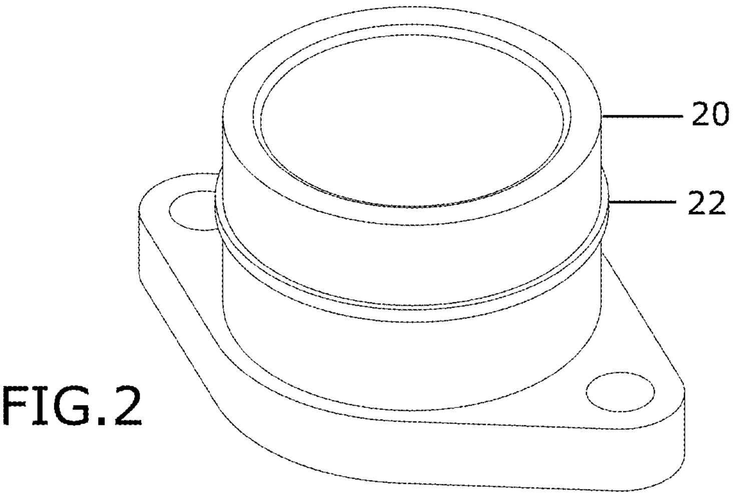
FIG. 2 is a perspective view of an exemplary embodiment of a metallic intake component 20 the present invention.
Figure 2B:
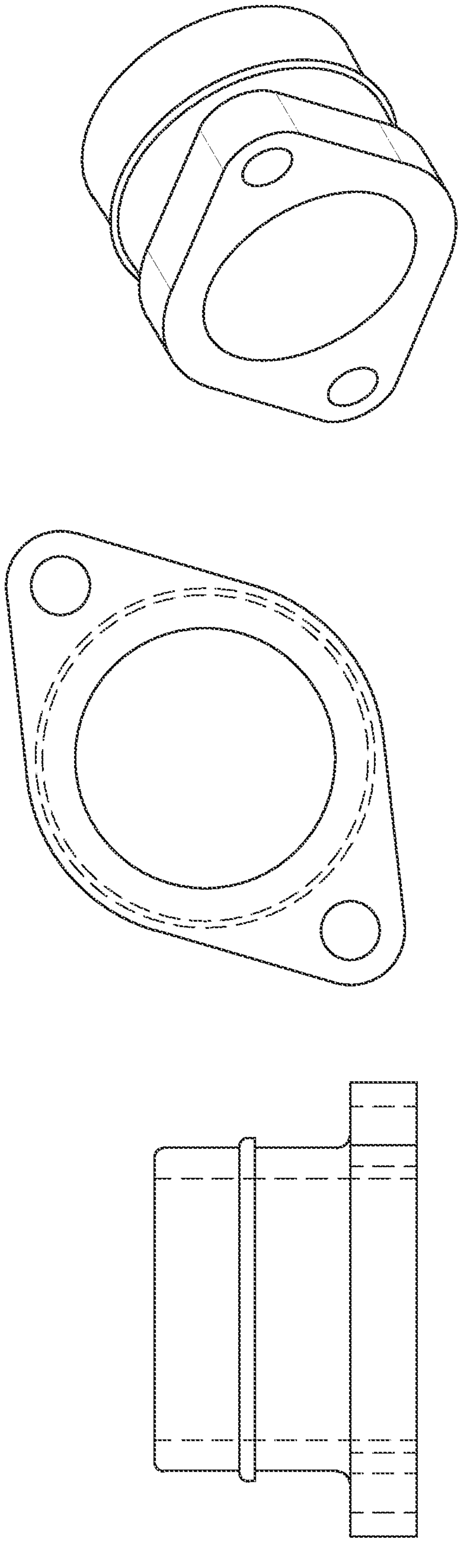
FIG. 2B shows various views of the metallic intake component 20 the present invention.
Figure 3:
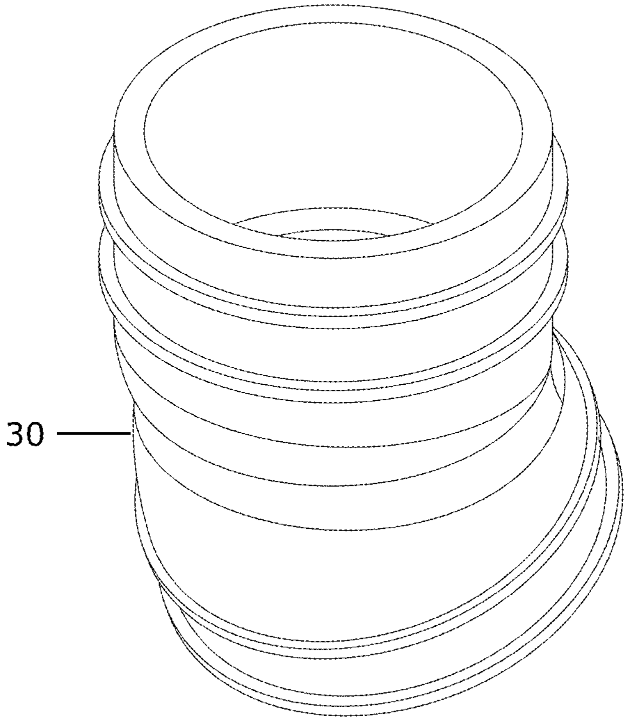
FIG. 3 is a perspective view of an exemplary embodiment of a coupler 30 of the present invention.
Figure 4:
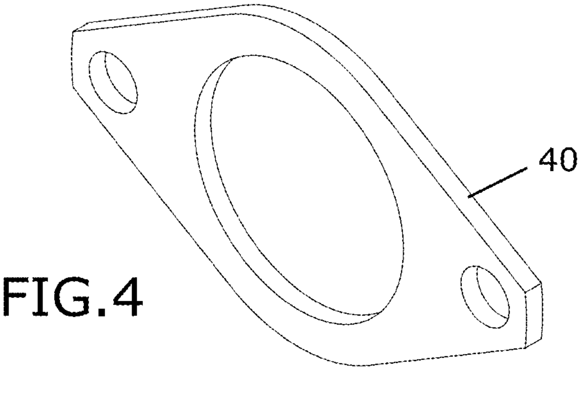
FIG. 4 is a perspective view of an exemplary embodiment of an intake manifold gasket 40 of the present invention.

The following detailed description is of the best currently contemplated modes of carrying out exemplary embodiments of the invention. The description is not to be taken in a limiting sense, but is made merely for the purpose of illustrating the general principles of the invention, since the scope of the invention is best defined by the appended claims.

Referring now to FIGS. 1 through 4, the present invention may include an intake manifold assembly for a high-performance engine. The intake manifold assembly may include a metallic intake manifold 20 to operatively interconnect a cylinder head to a rubber intake manifold 10. The metallic intake manifold 20 may be made of aluminum and be relatively short. An intake manifold gasket 40 may directly interconnect the metallic intake manifold 20 to the cylinder head, so that together the gasket and the intake manifold disperse heat and shock from the motor—the intake manifold gasket 40 provides a larger surface area than the prior art and is made of a material with low thermal heat conductivity (such as but not limited to RN-8011).

The rubber intake manifold 10 may be S-shaped so as to be dimensioned and adapted to fluidly connect the carburetor to the cylinder head (by way of the metal intake manifold 20 and the coupler 20). The rubber intake manifold 10 may be attached at the time of converting the carburetor of the ATV/QUAD. The "S" style rubber intake manifold 10 may be designed specifically for 37 mm and 39 mm FCR to fit from the carburetor to the OEM or aftermarket stock style air box. The carburetor may have a modified air/fuel adjustment screw already installed and set in the carburetor.

The metallic intake manifold 20 may be bolted to the cylinder head. The short rubber intake manifold or coupler 30 may be placed over the aluminum intake manifold 20 and clamped into place with provided hardware. The metallic intake manifold 20 may provide a holding ridge 22 to facilitate the connection of the coupler 30.

The opening of the coupler 30 that faces the carburetor should be facing downward. Modified versions of the FCR 39 mm carburetor may include internal portions of the short rubber intake, which is adapted to be clamped down. The "S" style rubber intake manifold 10 fluidly connects the carburetor to the OEM or aftermarket air box.

Clamps fasten the rubber intake to the air box, and the intake manifold to the carburetor. The aluminum intake manifold 20 provides a stable platform for the rest of the kit to be installed and supported properly.

The parts of the present invention are made specifically to work together as a kit. The aluminum and rubber intake manifolds 20 and 10 allow the carburetor and air box to be all attached as a flow (e.g., it is a continuous assembly) while also supporting the weight and abuse that the carburetor applies while riding. Beyond the intake manifold assembly, the carburetor would not need additional parts.

A method of installing the present invention includes the following steps: step 1, disconnect battery terminals; step 2, remove the top body and gas tank from the ATV/QUAD to gain access to the intake system; step 3, turn fuel switch to OFF setting; step 4, unscrew the two nuts holding the carburetor onto intake manifold; step 5, remover carburetor by unscrewing the side cap, loosening the throttle cable and unscrewing the throttle cable out of the carburetor and remove gas line; step 6, loosen the fasteners from the cylinder head and remove intake manifold and O-ring; step 7, install new gasket and bolts into aluminum intake mounting holes, screw onto the cylinder head and tighten; step 8, slide throttle cable end into the carburetor and screw in the adjuster, wrap the cable around the throttle linkage and place throttle clip into 2nd hold on the throttle plate; step 9, place modified side cover onto the carburetor and fasten screws; step 10, slide carburetor into the short rubber intake manifold all the way and tighten the provided clamp; step 11, unscrew the clamp holding the existing air box tube and pull away from the box; step 12, slide the "S" rubber intake manifold 10 onto the air box opening, fasten down with the clamp; step 13, slide smaller opening over the carburetor all the way over and tighten with the clamp; step 14, reinstall the gas tank back in position with the plastic body panel followed after; step 15, reattach the fuel line into the carburetor and turn fuel switch back on; and step 16, reattach the battery terminals.

A method of retrofitting the present invention includes the following. First disassemble the ATV and start removing parts like the air intake lid, the air filter, unbolting the air intake box, removing the air tube that runs from the carburetor to the air box, unscrewing the side cover of the carburetor, removing the throttle cable from the carburetor, unscrewing the two nuts at the back of the carburetor that hold the carburetor to the intake manifold, disconnect and remove the fuel line from the carburetor, removing the carburetor, unscrewing the Allen key bolts that hold the intake manifold to the cylinder head.

To be clear, the present invention can be installed on different forms of vehicles, such as but not limited to a golf-cart or go-kart, as the motor is still the same and so the present invention can be used.

Figure 5:
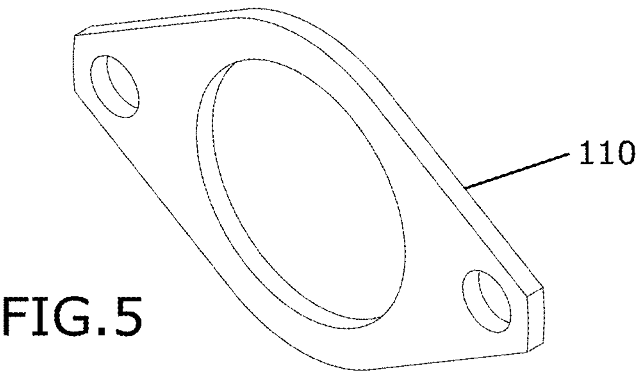
FIG. 5 is a perspective view of an exemplary embodiment of a gasket of the present invention.
Figure 6:
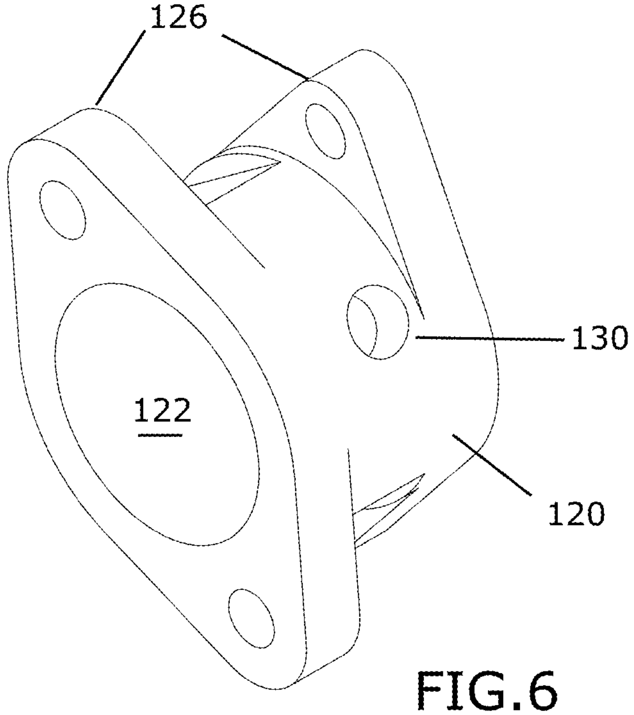
FIG. 6 is a perspective view of an exemplary embodiment of an intake manifold of the present invention, illustrating that the port flanges 126 may be "eye-shaped" (similar to the shape of the gasket 110 illustrated in FIG. 5), wherein at the midpoint of the periphery of the eye-shape the port flange may not extend beyond the circumference of the body of the intake manifold 120, and wherein a valve point or opening may be provided for fluidly coupling a pressure valve with an inner bore of the intake manifold 120.

Referring to FIGS. 5 and 6, the present invention may include a one-piece aluminum intake manifold 120 with pressure relief valve and an associated gasket 110. In certain embodiments, the aluminum intake manifold 120 may be dimensioned and adapted for (but is not limited to) a 1987-2004 Yamaha warrior YFM350.

As mentioned above, when pressure is released back into the intake manifold, the pressure is trapped between the butterfly valve of the carburetor and closed valve from the motor. The trapped gases are already heated and expanded, causing the intake manifold to fail. With the combination of the gasket 110 and aluminum intake manifold 120 with a pressure relief valve, the heated and expanded gases can escape without any failure resulting from repetitive use.

The pressure relief valve may be disposed along the body of the aluminum intake manifold 120, generally halfway between the intake port 122 and output port at a valve point 130. The port flanges 126 associated with the intake port 122 and output port may be radially staggered 45 degrees. The valve point 130 may be disposed between the port flanges 26, typically along a circumference of said body where the port flanges 126 are not protruding, as illustrated in FIG. 6.

The present invention can replace OEM or aftermarket intake manifolds that break apart since the aluminum intake manifold 120 with a pressure relief valve embodied therein resist the pressures that cause other OEM or aftermarket intakes to fail.

Figure 7:
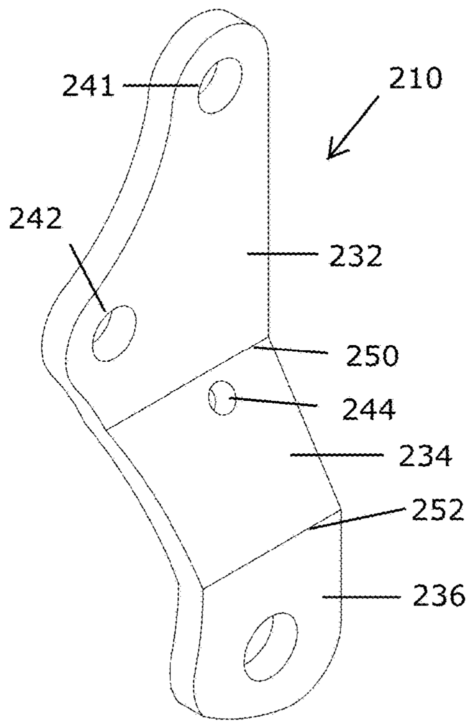
FIG. 7 is a perspective view of an exemplary embodiment of a left-side engine mount bracket of the present invention.
Figure 8:
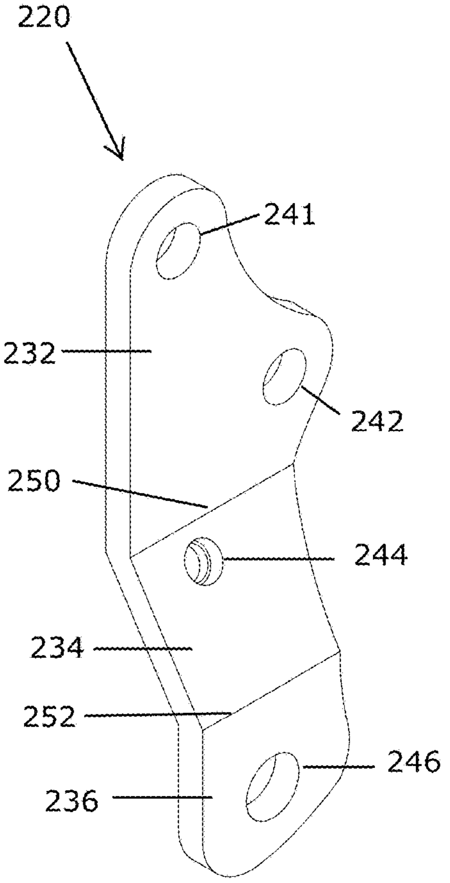
FIG. 8 is a perspective view of an exemplary embodiment of a right-side engine mount bracket of the present invention.
Figure 8A:
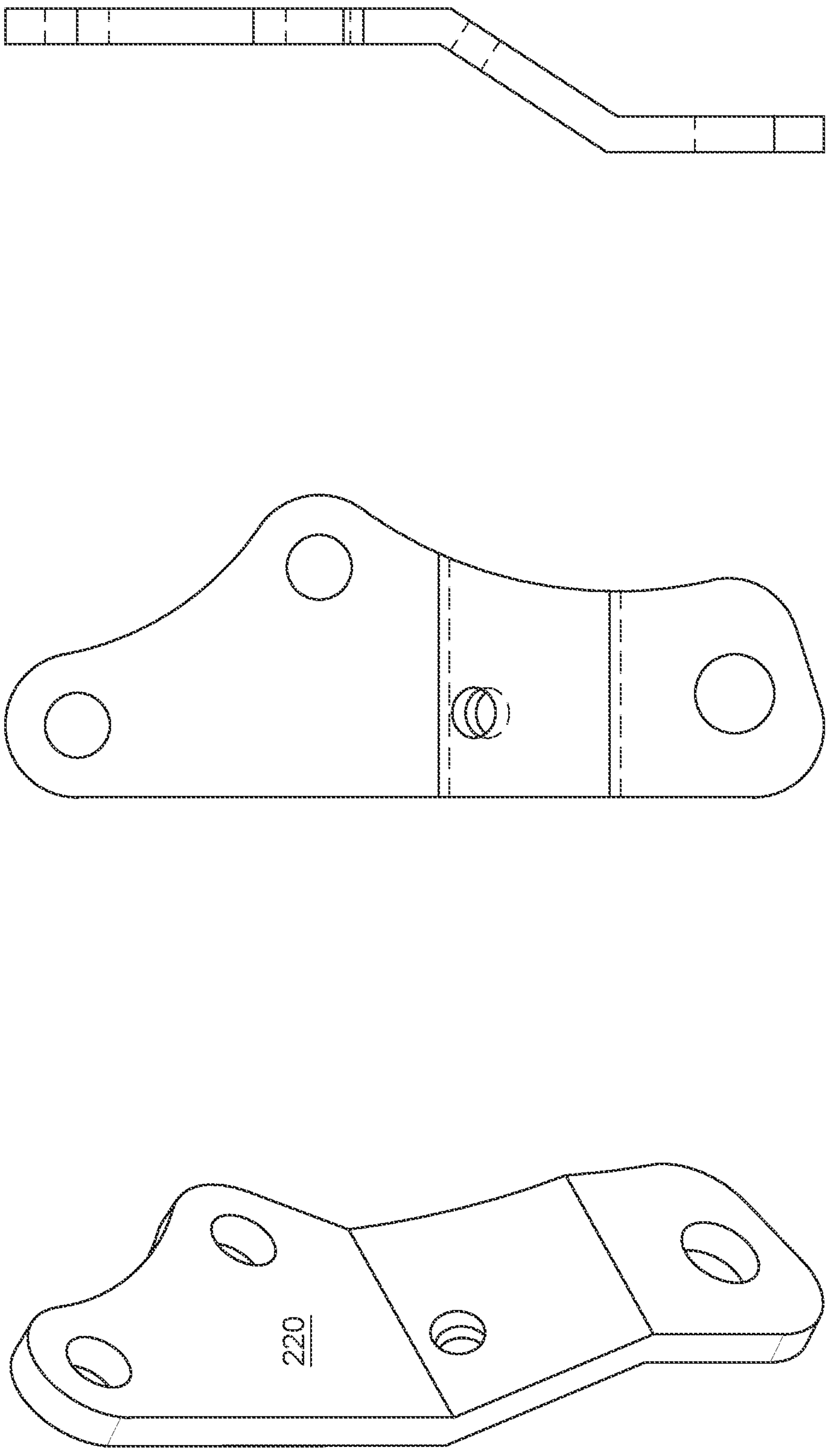
FIG. 8A shows various view of the right-side engine mount bracket of the present invention.
Figure 8B:
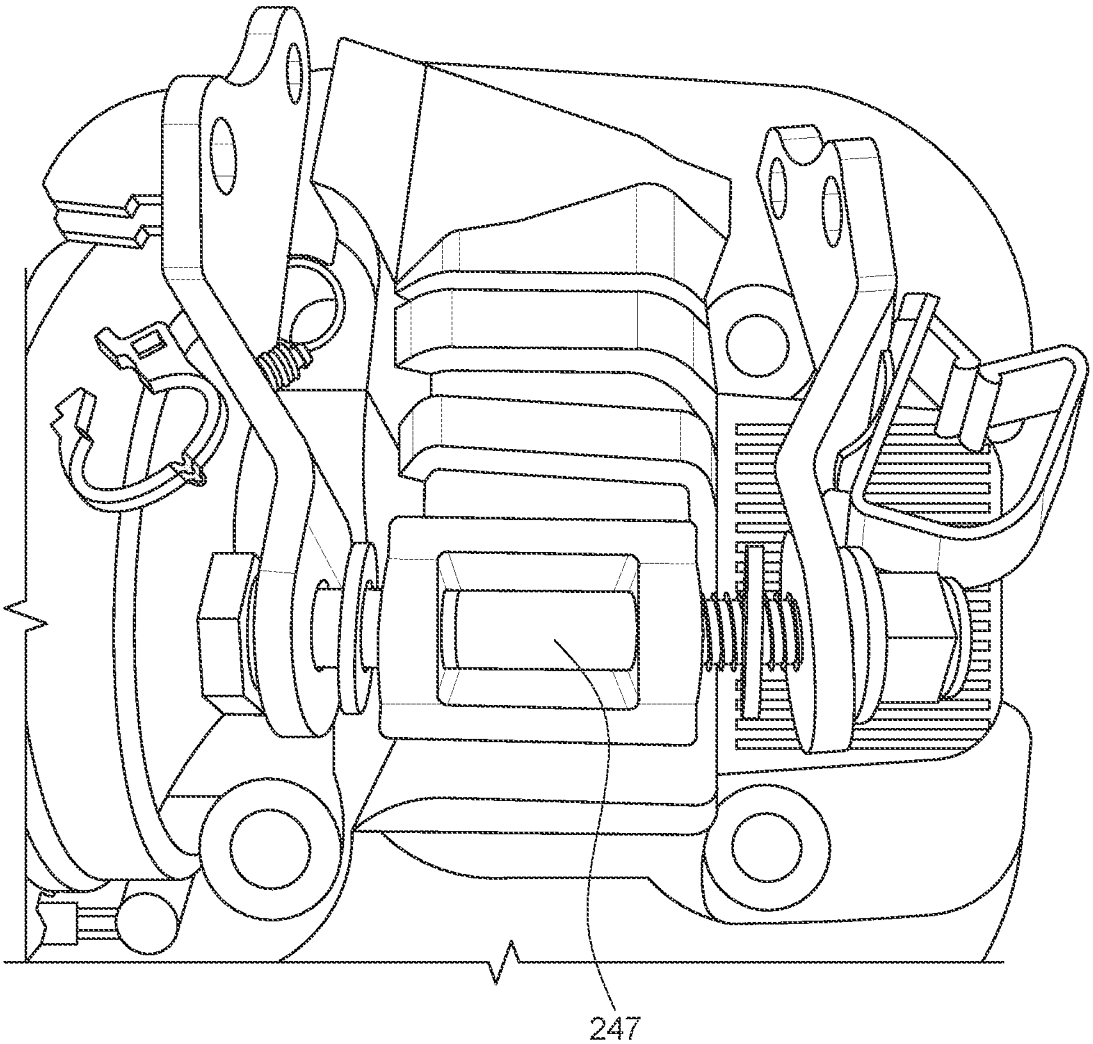
FIG. 8B is a perspective view of the left-side and the right-side engine mount brackets of the present invention shown in use.

Referring now to FIGS. 7 and 8B, the present invention may include a top left aluminum engine mount bracket 210 (FIG. 7) and a top right aluminum engine mount bracket 220 (FIG. 8) for an ATV/QUAD, such as but not limited to a 1987-2004 Yamaha warrior YFM350.

The top left and top right engine mount brackets 210 and 220 are designed to work together in concert to keep the top of the associated motor from moving, as illustrated in FIG. 8B. The brackets will need to be used together, neither one can just be installed by itself.

Each bracket 210 and 220 has a first portion 232, a middle portion 234, and a second portion 236, wherein the first portion 232 and the second portion 236 are parallel to each other though offset in plane by the middle portion 234 that is transverse relative to both first and second portions 232 and 236, as illustrated in FIGS. 7 and 8. The first, middle and second portions 232, 234, and 236, respectively, of brackets 210 and 220 may be mirror images of each other. The first portion 232 may have a mitten-shape, where a first hole 241 and a second hole 242 is disposed in the fingertip and thumb portions of the mitten-shaped first portion, respectively. A lower hole 246 near the lower portion of each engine bracket 210 and 220 are for engaging opposite sides of a pin 247 that attaches to the engine, as illustrated in FIG. 8B.

The first and second interfaces 250 and 252 of the middle portion 234 relative to the first and second portions 232 and 232 may be a bend line. The middle hole 244 may be just downward of the first interface 250. By locating the middle hole 244 location to adjacent to the first interface 250 (as opposed to a lower near the second interface 252) the present invention enables a wire (by way of a wire harness clip) that engages said middle hole 244 to be taught with no slack and thus no freedom to move during use. If the middle hole 244 were the second interface, the wire would be loose and have slack and thus, disadvantageously, more freedom to move. near Moreover, the left or right sides cannot change sides due to the design and orientation of the brackets 210 and 220, and their advantageous hole location.

Figure 9:
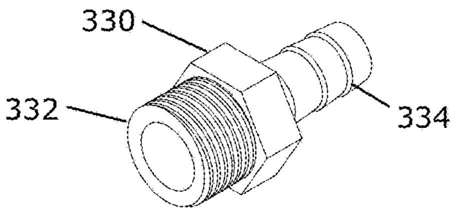
FIG. 9 is a perspective view of an exemplary embodiment of the present invention.
Figure 7A:
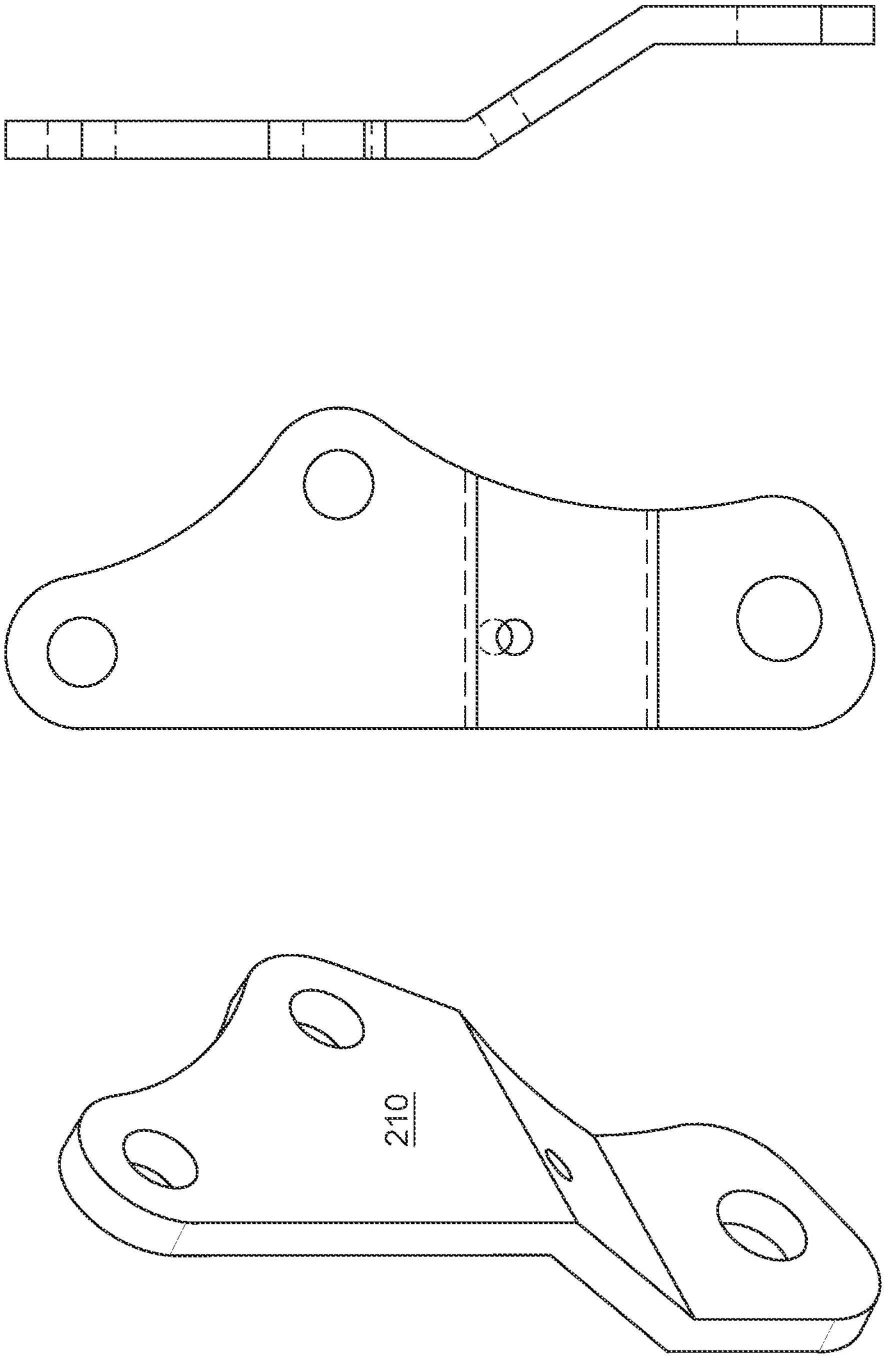
FIG. 7A shows various view of the left-side engine mount bracket of the present invention.
Figure 9A:
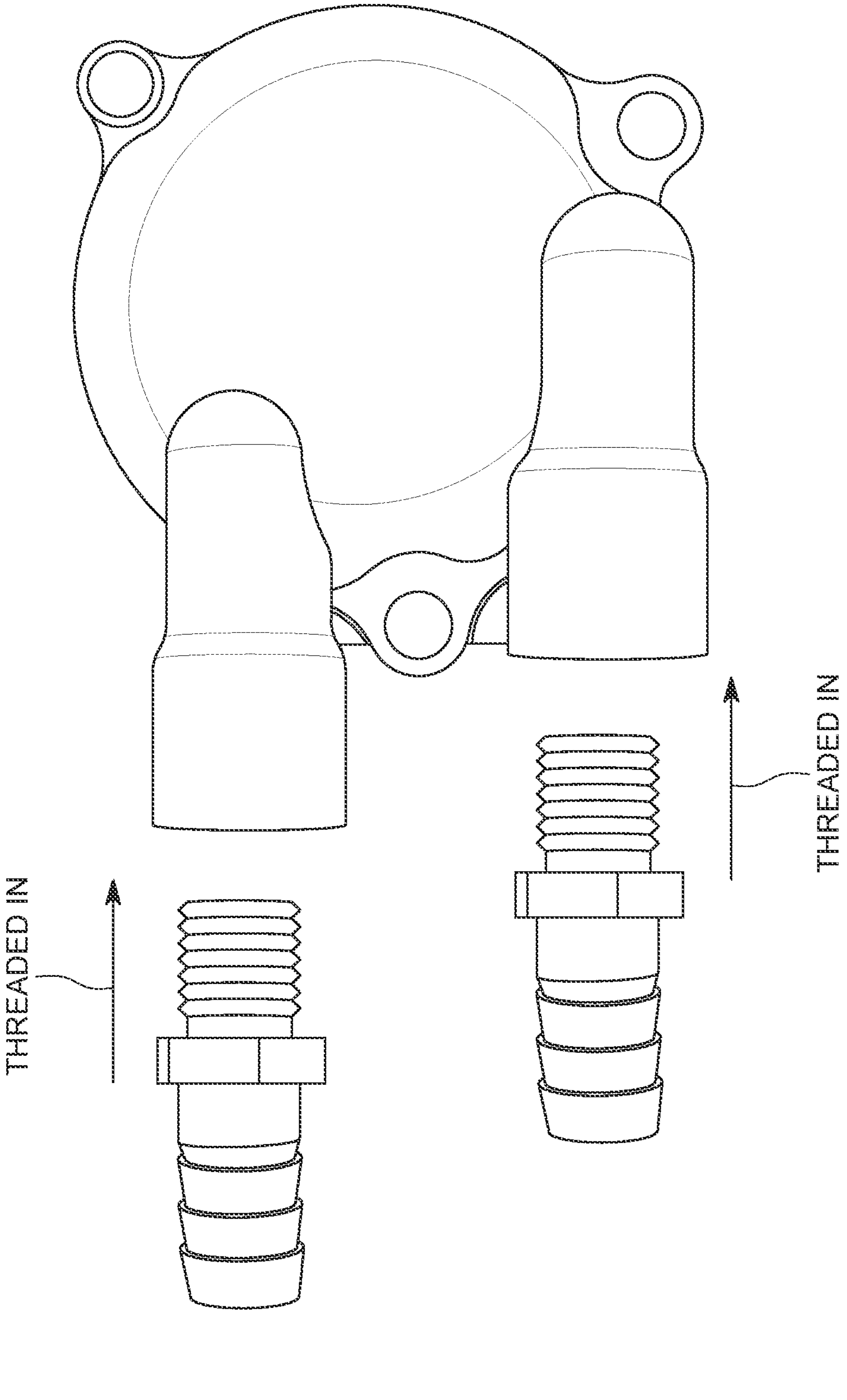
FIGS. 9A-9G shows various views of exemplary embodiments of the present invention.
Figure 9B:
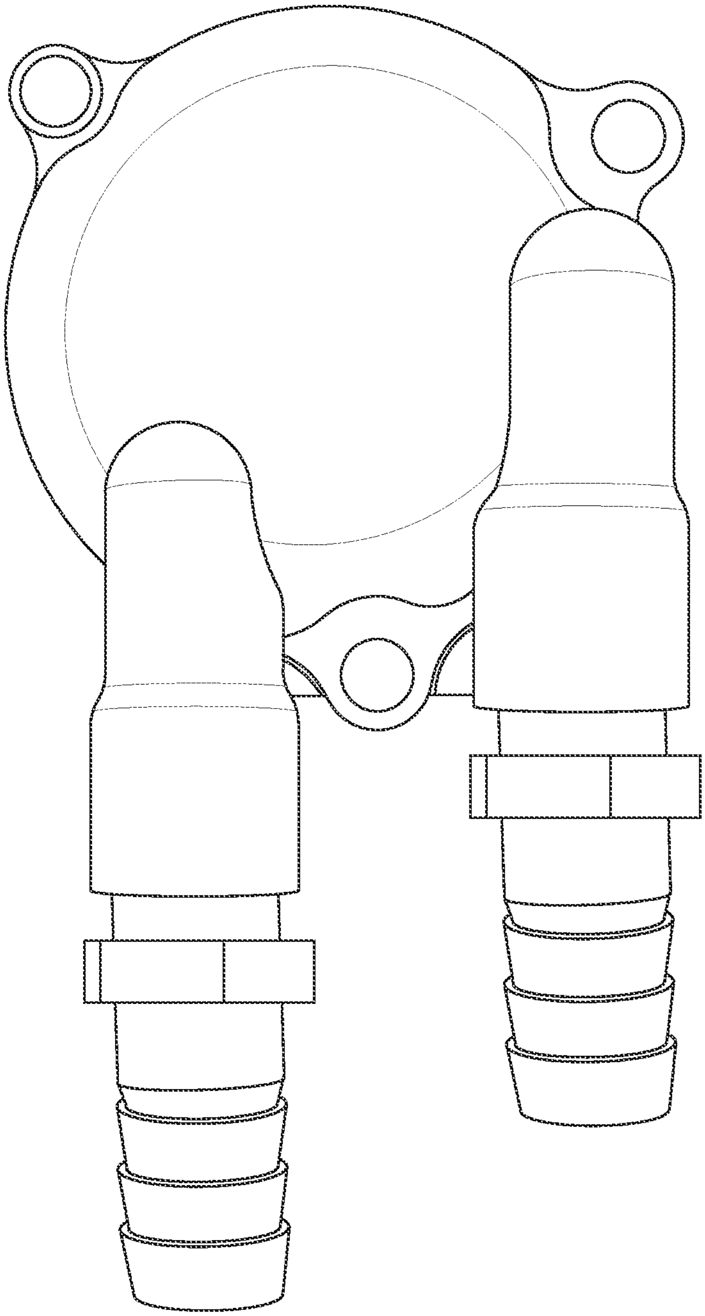
Figure 9C:
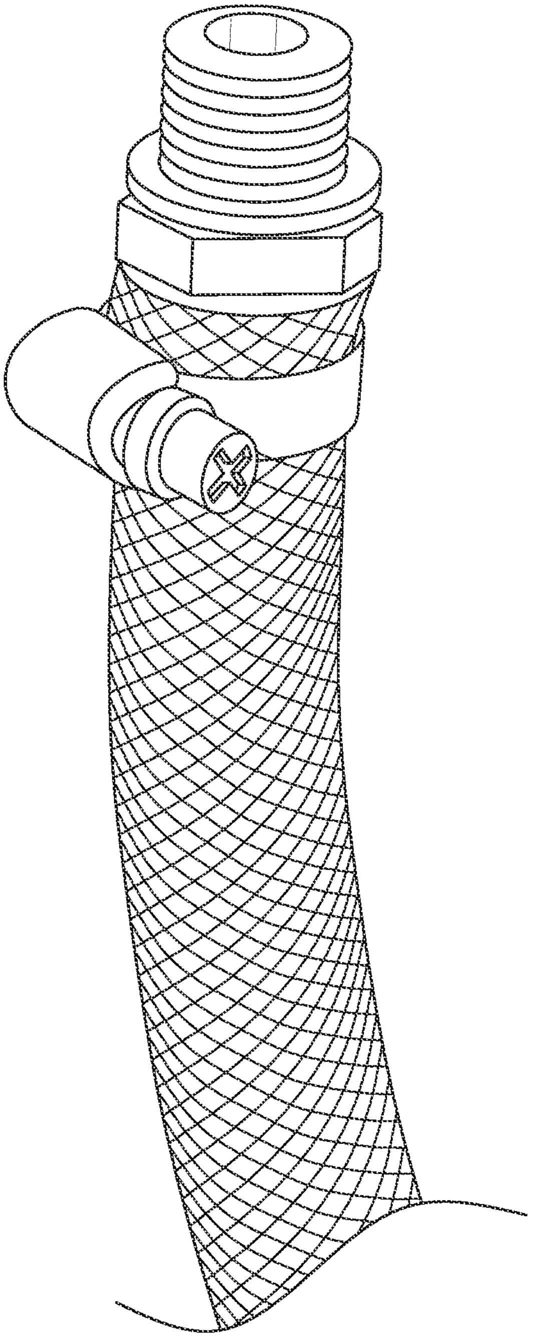
Figure 9D:
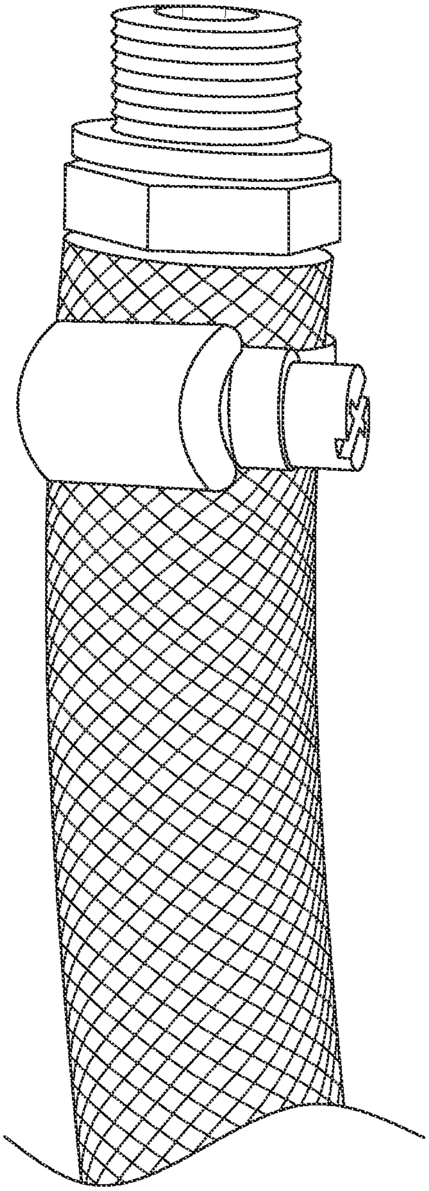
Figure 9E:
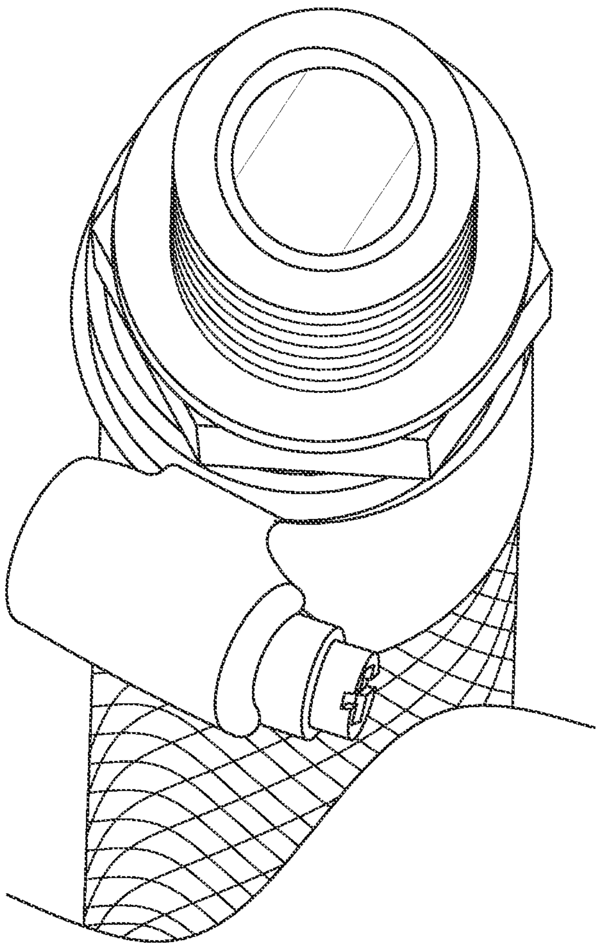
Figure 9F:
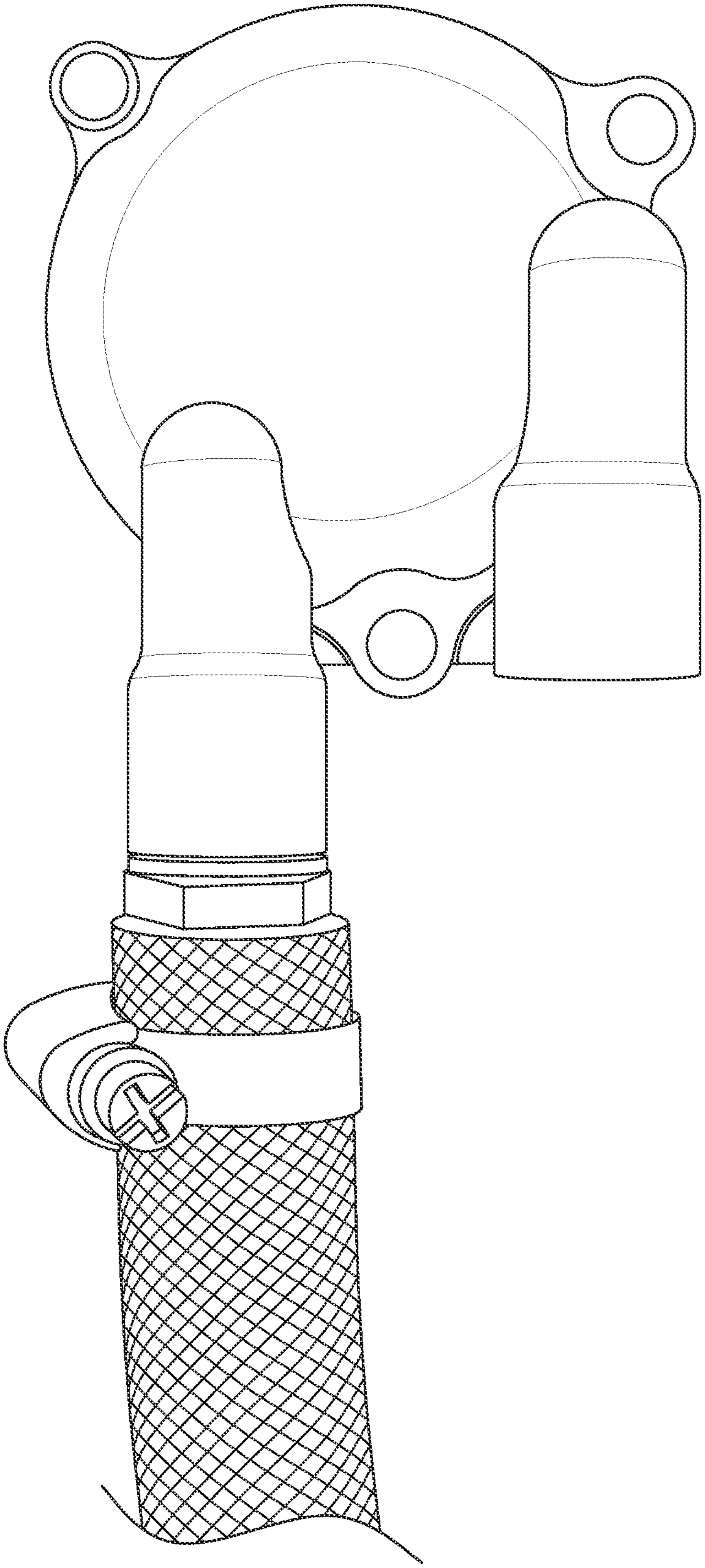
Figure 9G:
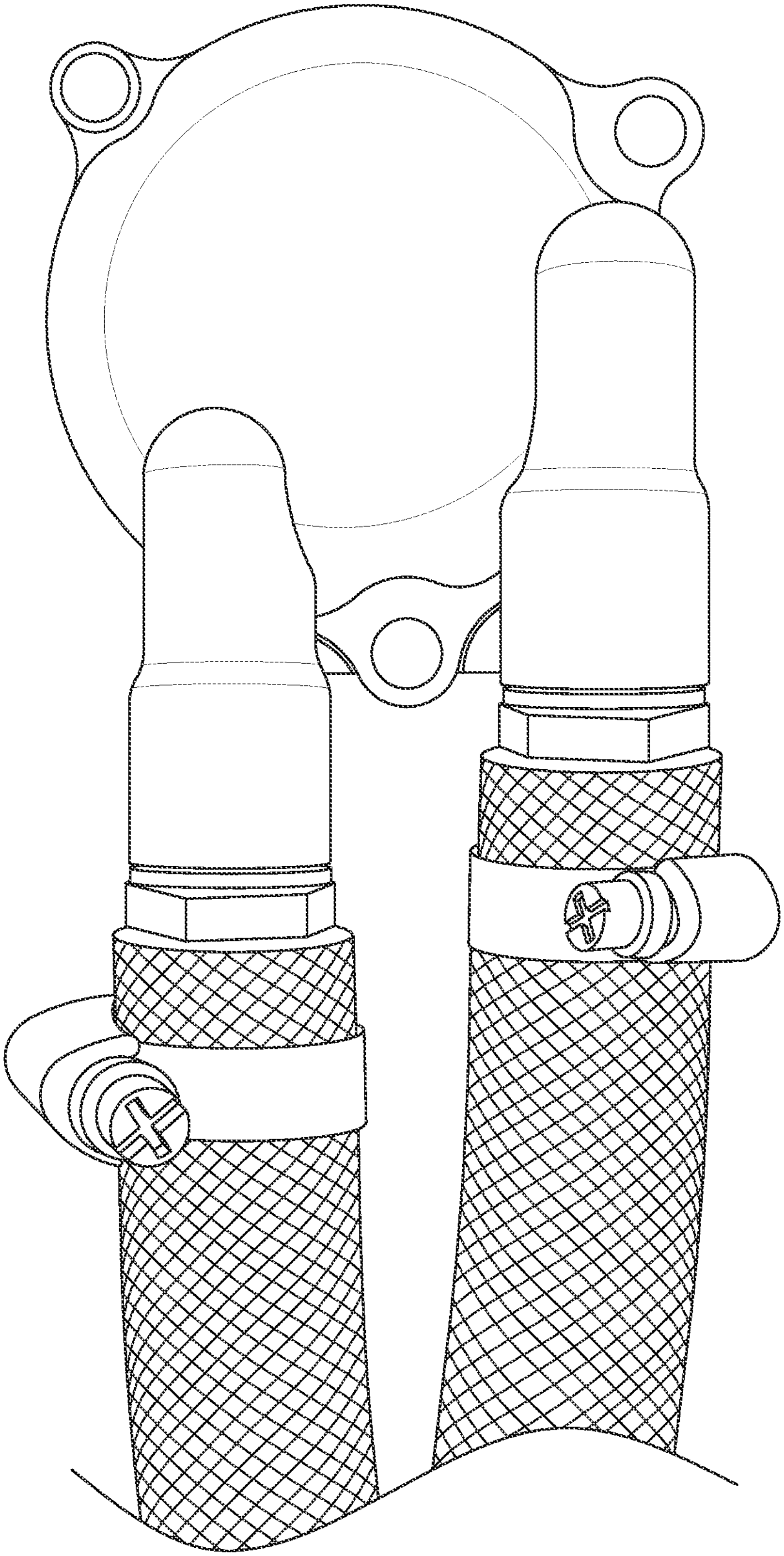

Referring to FIGS. 9 through 9G, the present invention may include the left-side aluminum mounting bracket 210 and the right-side mounting bracket 220 disclosed above, as well as a male barb fitting 330. The male barb fitting 30 may be a 14×1.5 male barb, ½ inch or 12 mm, to be used in place of the existing original equipment manufacturer (OEM) oil fitting.

The barbed fitting 330 is dimensioned and adapted to fit and secure an adequately sized oil line/hose so that the oil line/hose does not fall while on the barbed fitting 330. The barb fitting 330 may have a threaded end 332 and a tiered end 334. The barb fitting 330 can work and perform by itself to hold the oil line in place without additional equipment.

Figure 21A:
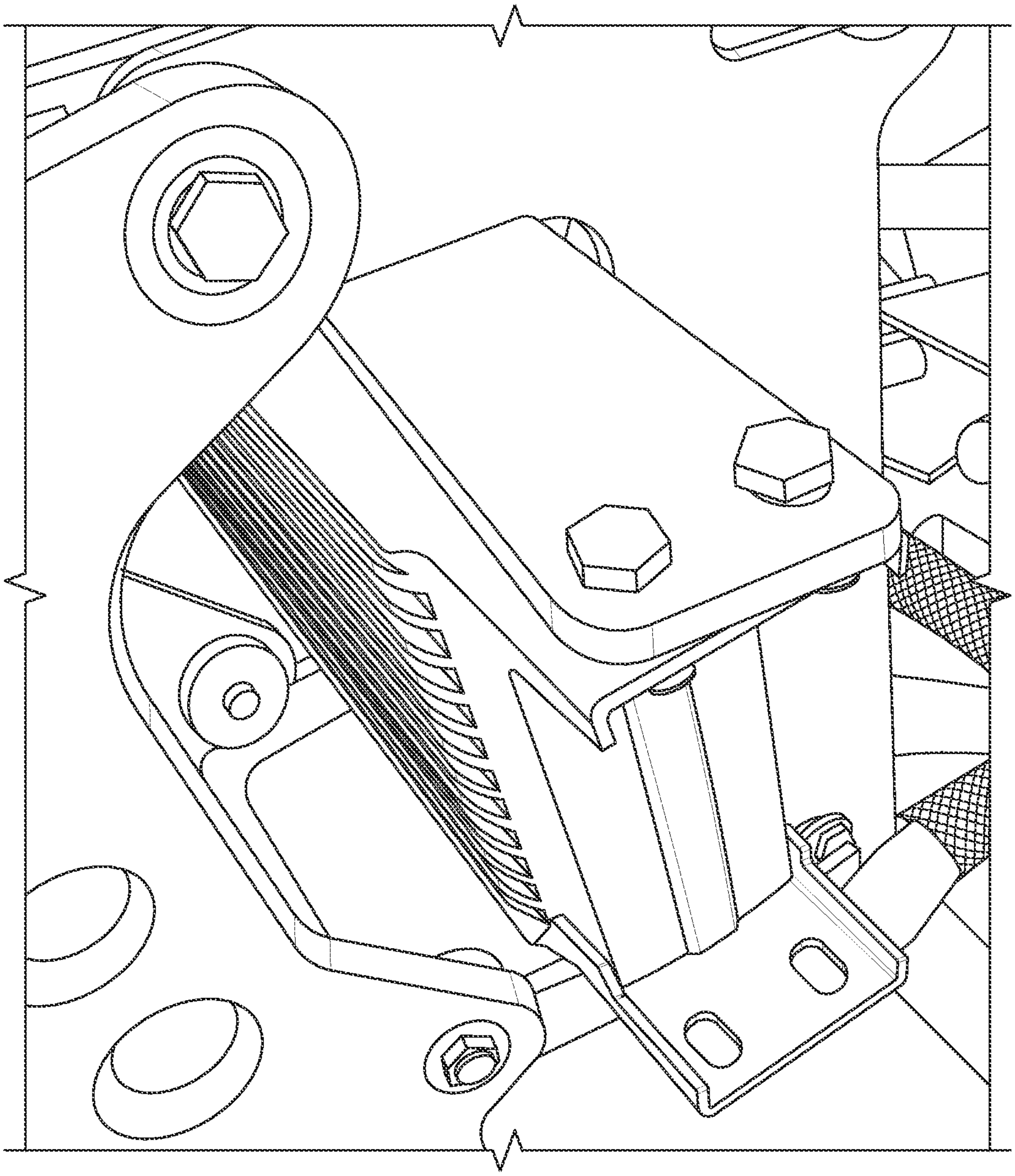
FIGS. 21A through 21E show various views of exemplary embodiments of the systemic components of the present invention.
Figure 21B:
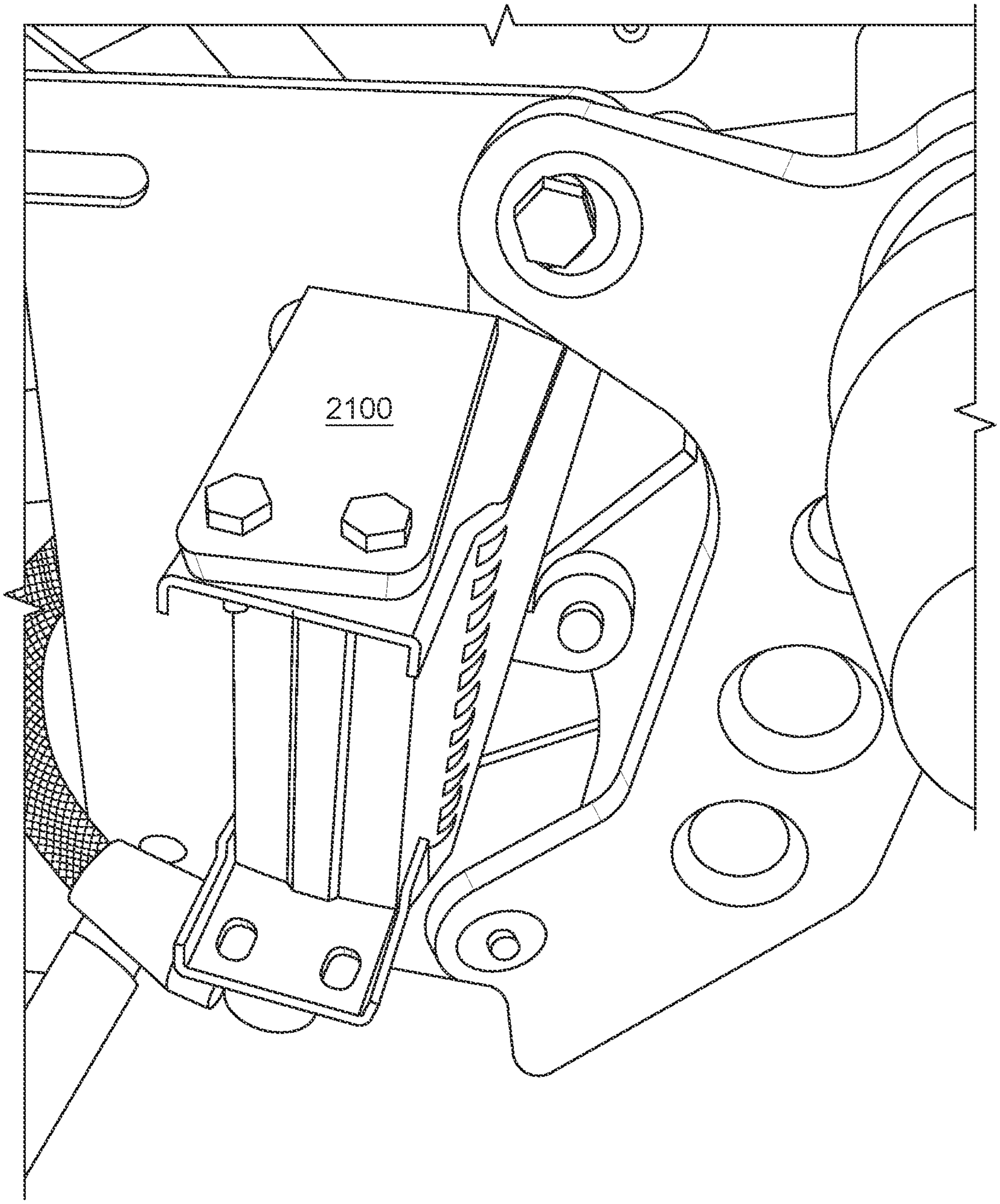

Referring to FIGS. 21A through 21B, mounting bracket 2100 may work in concert and are specially designed to operatively associate with a ATV/QUAD machine, such as but not limited to the 1987-2004 Yamaha YFM 350 frame/chassis, enabling the mounting of the oil cooler in a fixed, safe and sturdy position with the ability of remounting the existing front bumper.

Figure 21C:
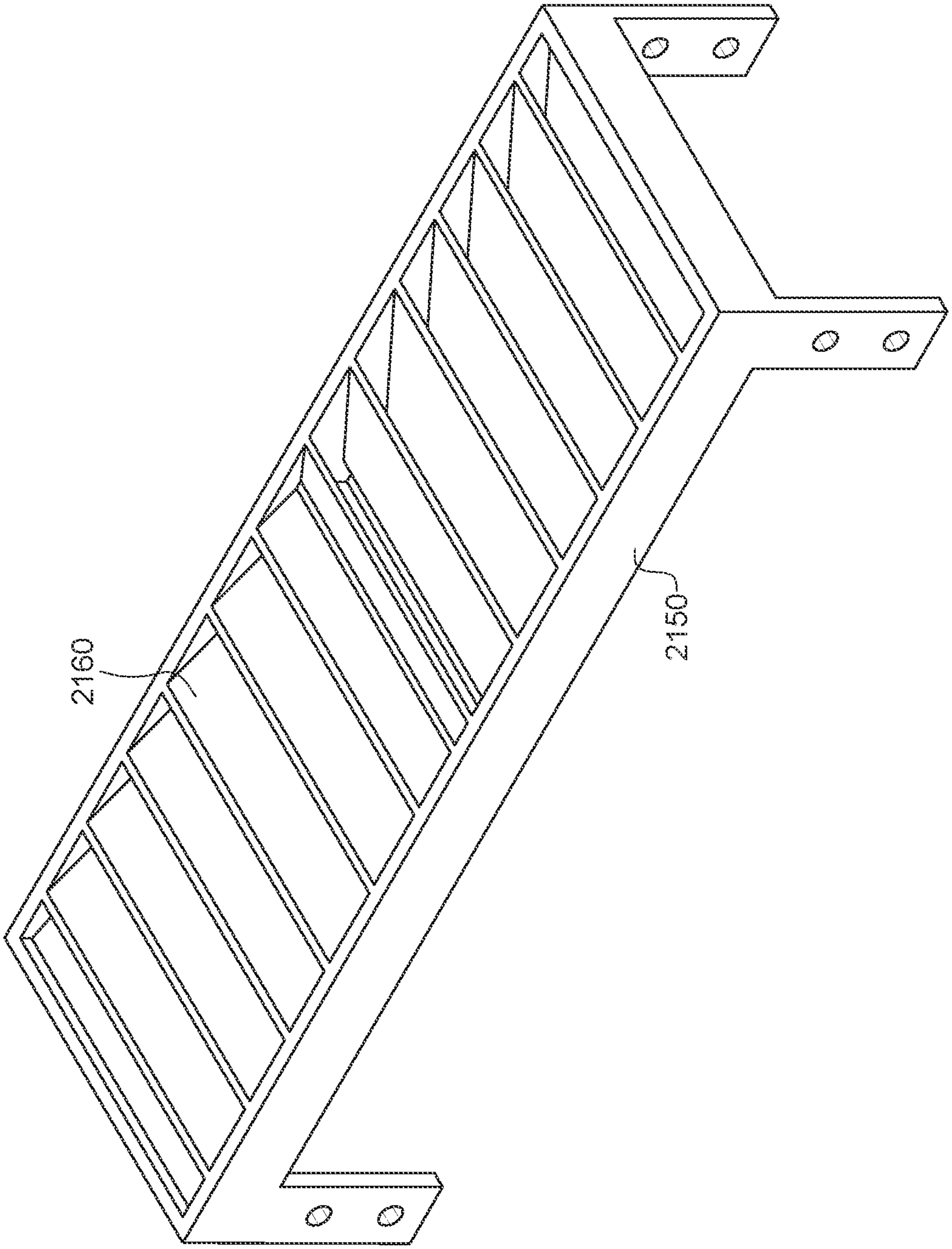
Figure 21D:
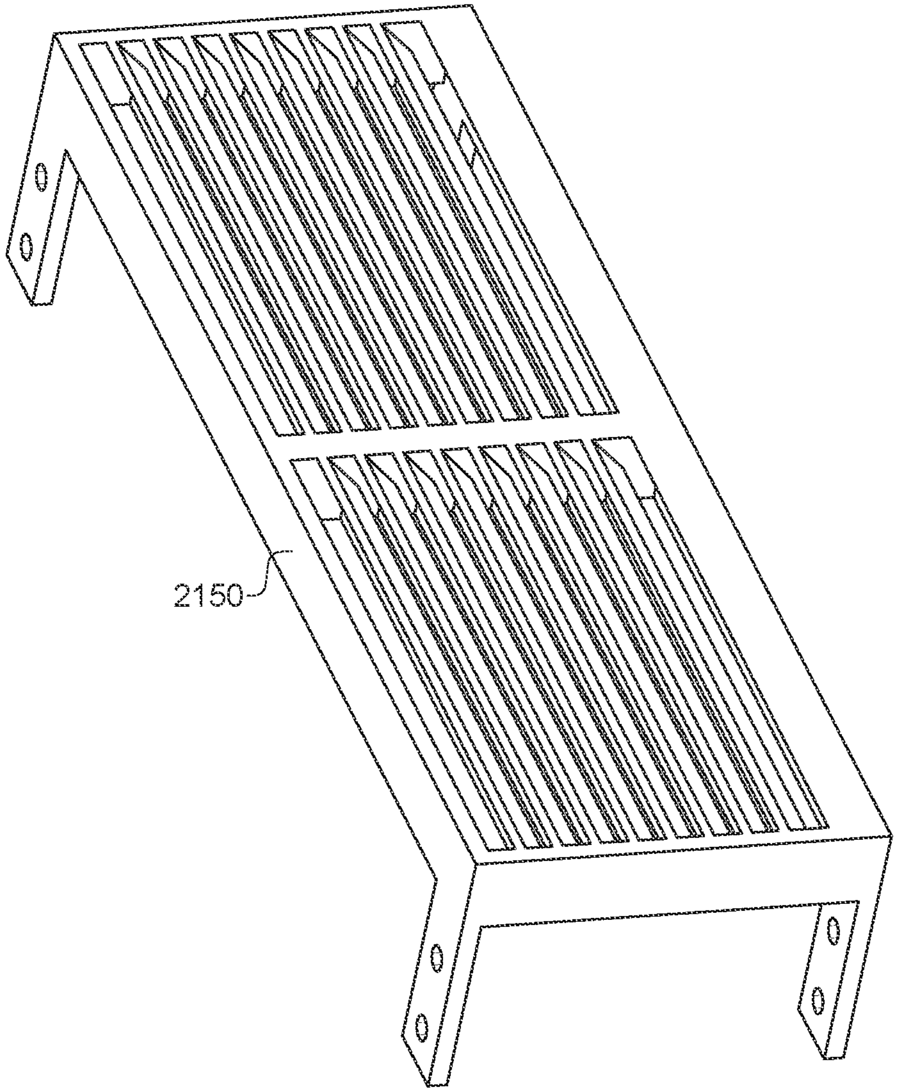
Figure 21E:
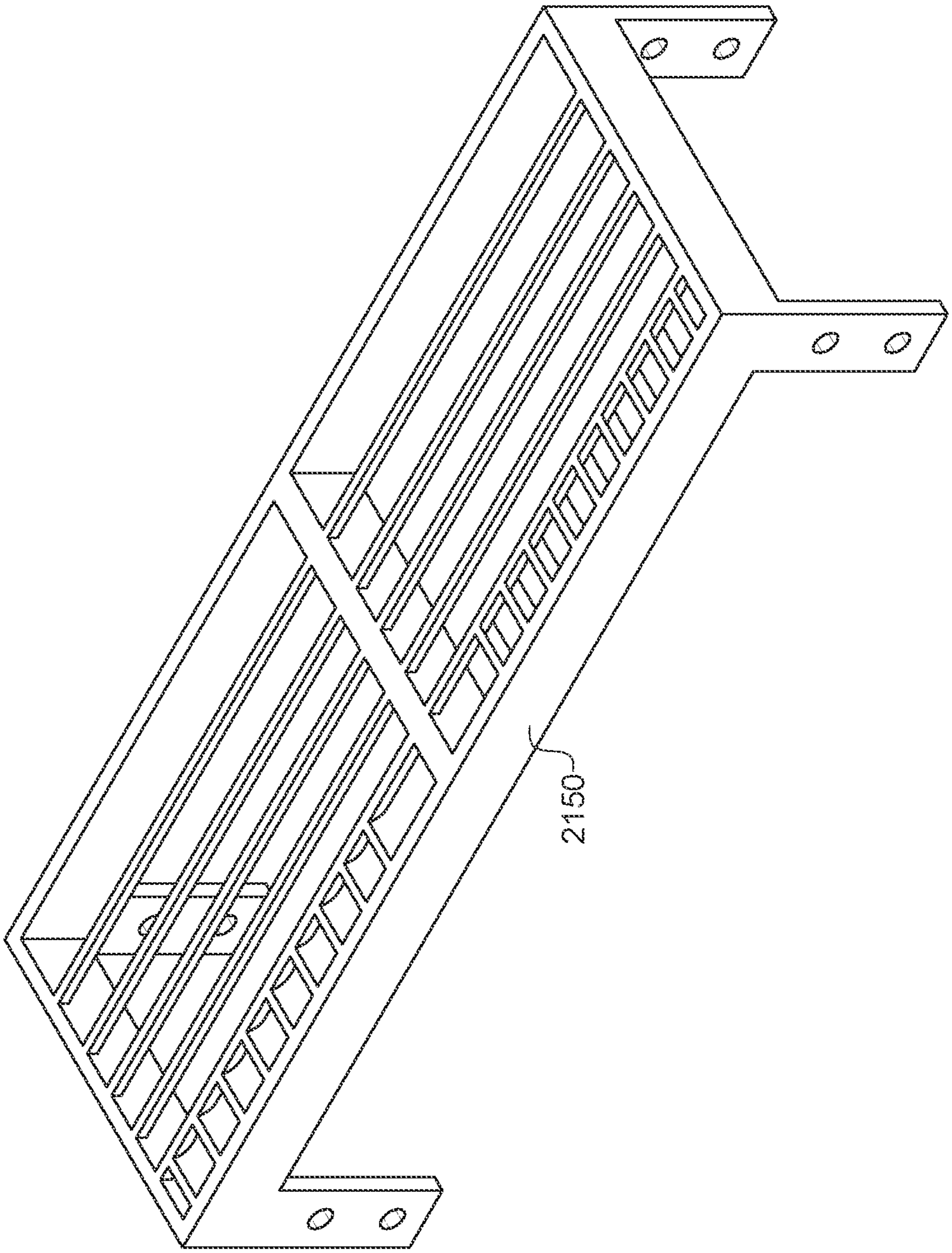

Referring to FIGS. 21C through 21E, the present invention may include an oil cooler guard 2150 with horizontal and vertical directional slots/fins 2160, corresponding tabs or mounting pieces that are a solid piece that allow the guard to mount to the oil cooler. The oil cooler guard 2150 is designed to for the purpose of disrupting any debris (mud, water, wood sticks/twigs/branches, stones) from clogging, blocking, damaging the oil cooler or cooling passageways.

The mount brackets 2100*s* work in concert to provide a stable mount. A method of installing the present invention may include the following. An installer would need knowledge of how oil flows through a motor and the advantages of cooling the oil could use the appropriate tools to install. Adding additional supports to the mounting bracket 2100 would make it stronger but is not needed. Once the mount brackets 2100 and barbed fitting 330 are installed, the problem of mounting an oil cooler and front bumper on the ATV/QUAD machine would be solved.

Additionally, the present invention could be used if the frame or mounting holes from the bracket were the same as the frame of the intended machine. The barbed fitting 330 may be part of an oil cooler kit. The oil cooler kit would not only fit the engine it is intended for but would still work if the entire motor was installed in a different vehicle type, such as in a golf cart.

Figure 10:
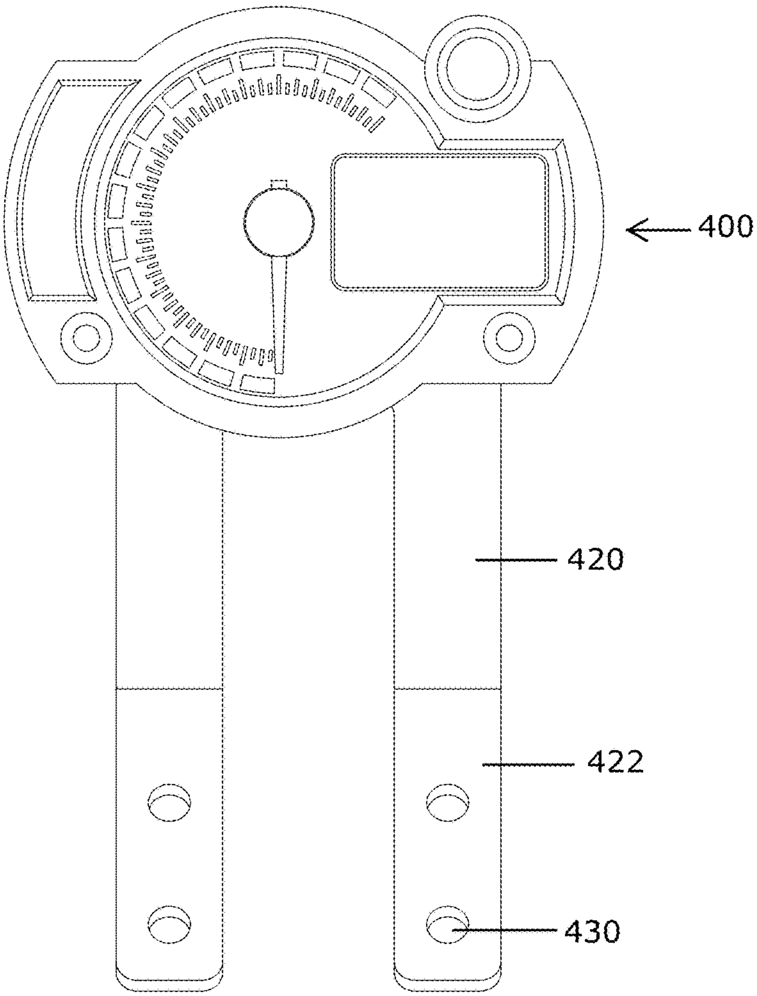
FIG. 10 is an elevation view of an exemplary embodiment of the present invention.
Figure 11:
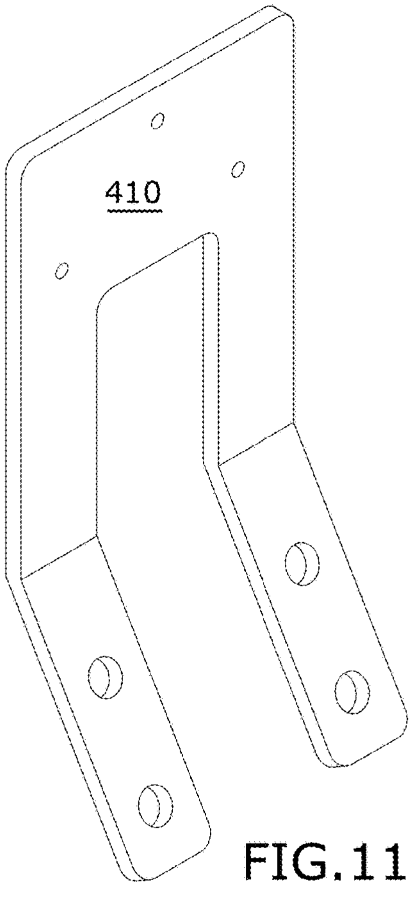
FIG. 11 is a perspective view of an exemplary embodiment of the present invention.
Figure 12:
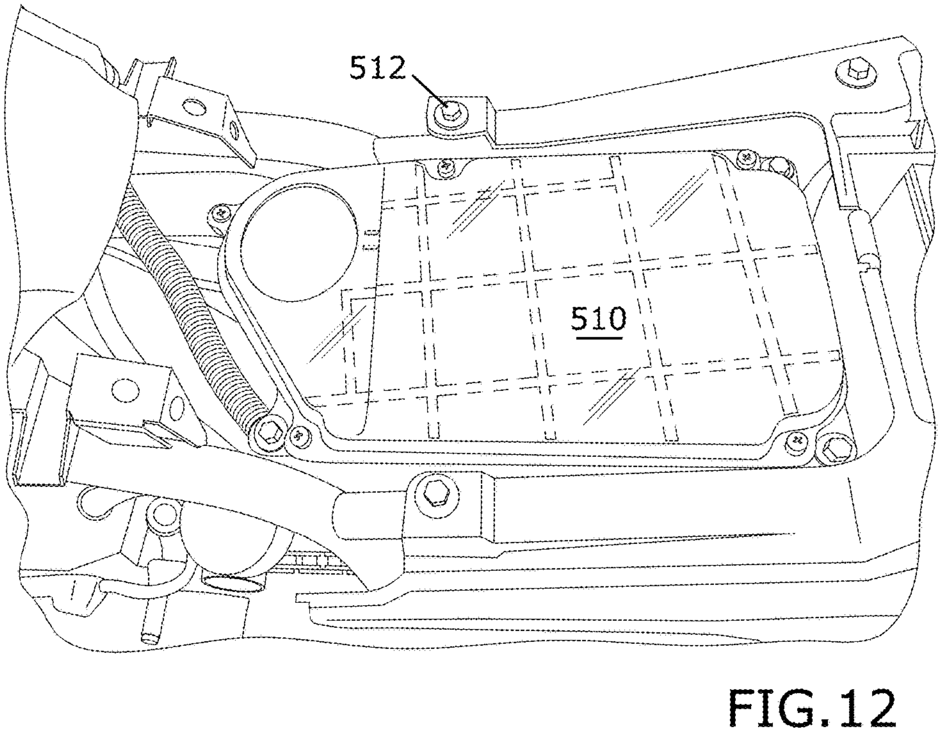
FIG. 12 is a perspective view of an exemplary embodiment of the present invention, shown in use.
Figure 13:
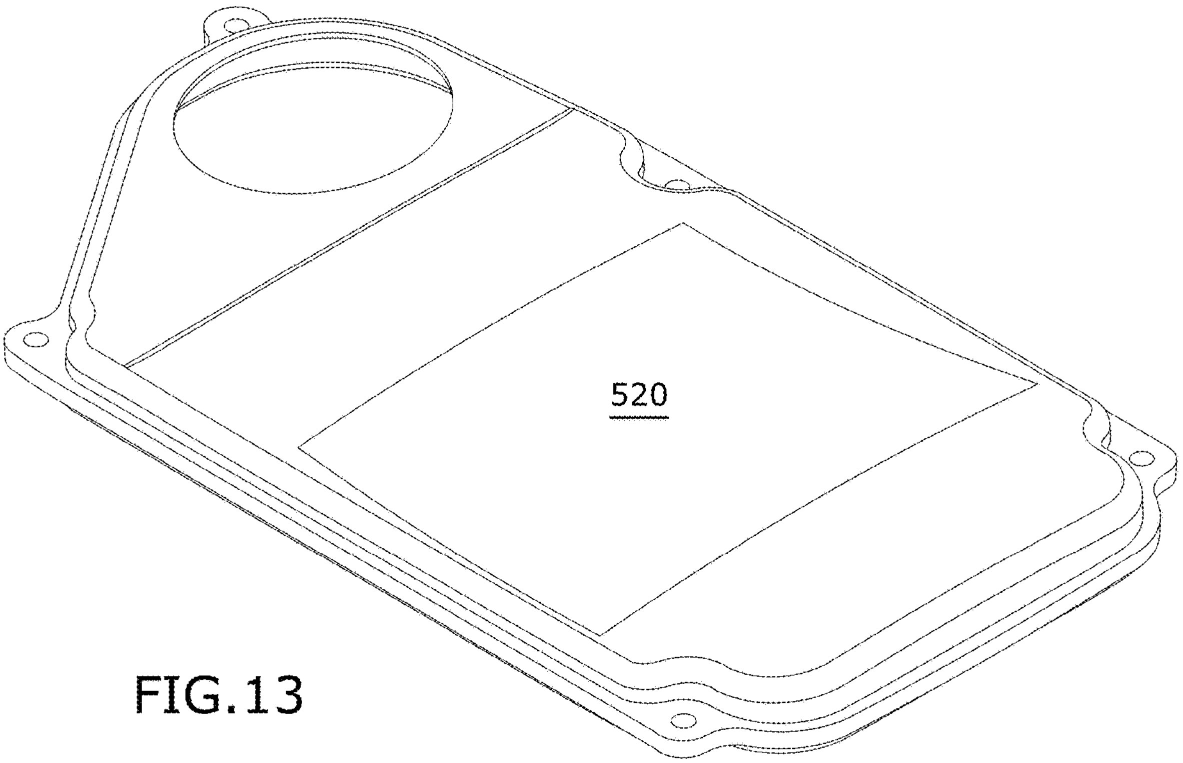
FIG. 13 is a perspective view of an exemplary embodiment of the present invention, note the article shown is transparent (even absent the shading)
Figure 14:
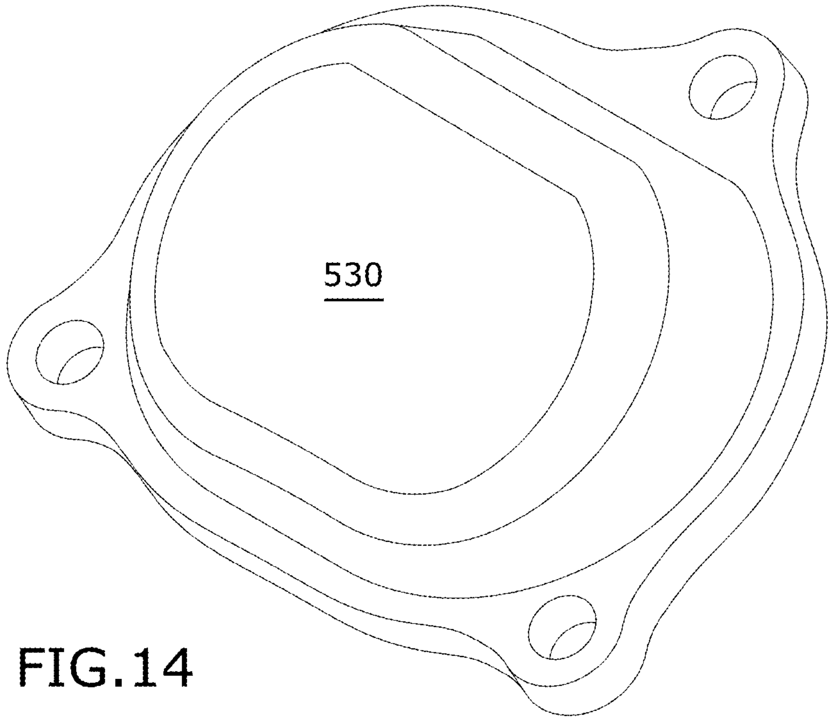
FIG. 14 is a perspective view of an exemplary embodiment of the present invention, note the article shown is transparent (even absent the shading)
Figure 15:
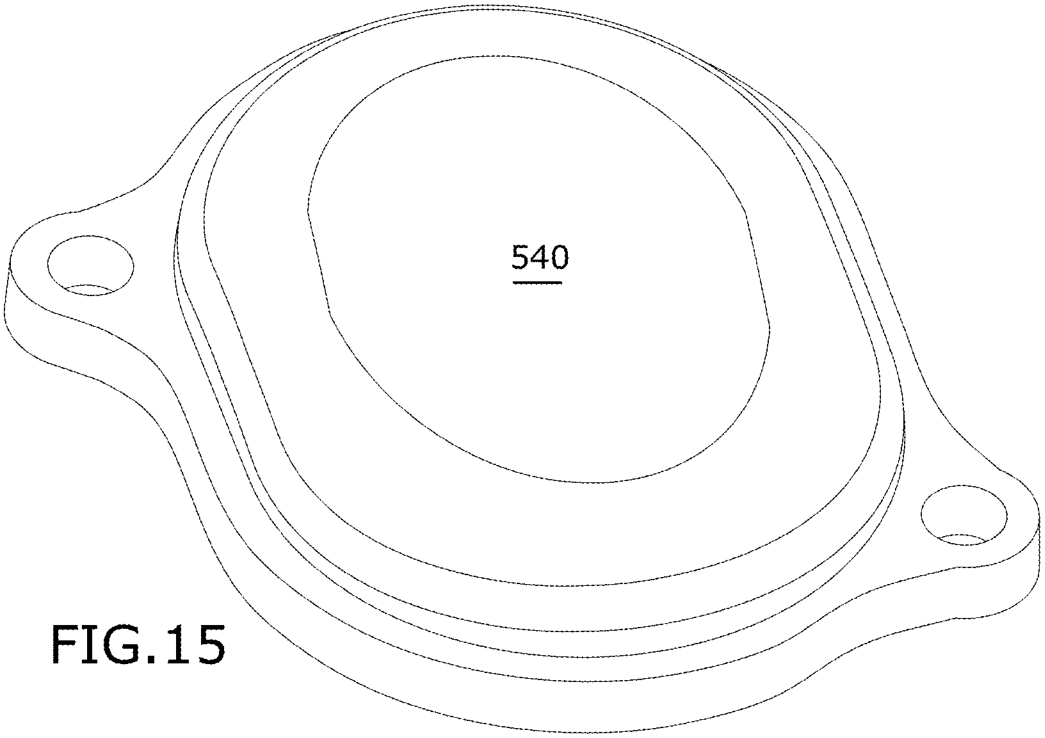
FIG. 15 is a perspective view of an exemplary embodiment of the present invention, note the article shown is transparent (even absent the shading)
Figure 16:
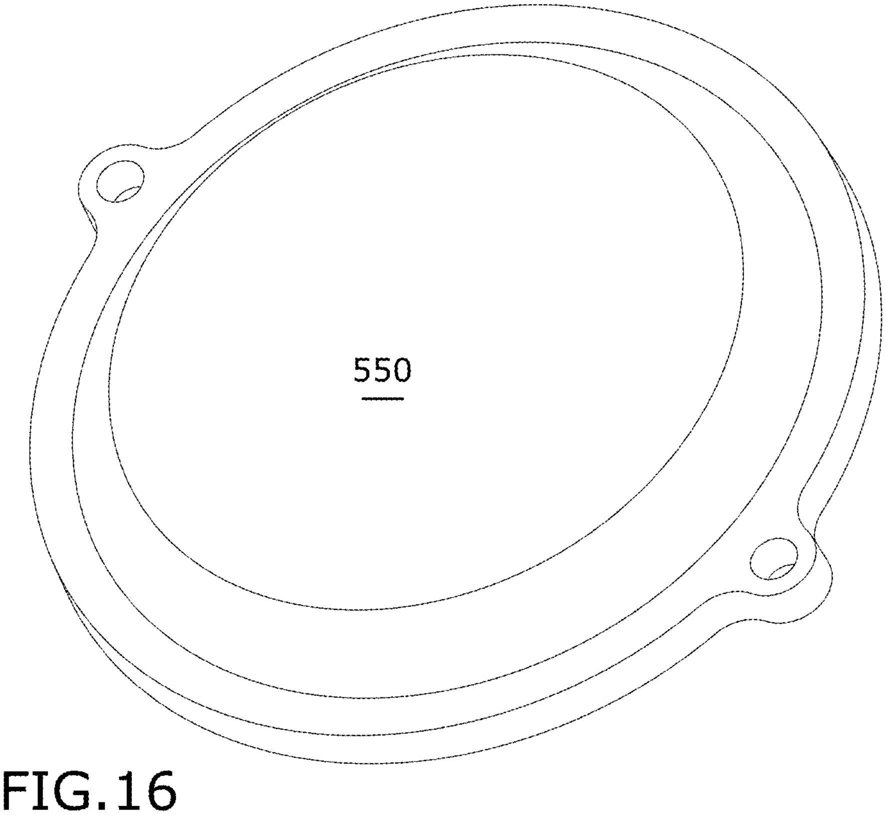
FIG. 16 is a perspective view of an exemplary embodiment of the present invention, note the article shown is transparent (even absent the shading)

Referring now to FIGS. 10 and 11, the present invention provides a reconfigured 1987-2004 Yamaha Warrior YFM350 replica speedo and tachometer with mounting bracket 410 that includes a KOSO replica SS182 15000 RPM revolution counter/tachometer 400. The replica speedo configuration includes color-coded wiring configurations (not shown) for a head unit (not shown), wherein the mounting bracket 410 is dimensioned and adapted to mount the revolution counter/tachometer 400 to the handlebars of the ATV/QUAD machine.

A method of installation of the present invention may include the following. The head unit (and associated pins) for electrically configuring the revolution counter/tachometer 400 need to be properly switched out. The revolution counter/tachometer 400 is mounted to the mounting bracket 410. The mounting bracket 410 has a U-shape, wherein a lower portion 422 of the both legs 420 (of the U-shape) are tilted at a twenty-five to thirty-five ("approximately thirty degree") degree angle relative to the remaining portion of the mounting bracket 410. The lower portions 422 are dimensioned and adapted to be mounted to the ATV/QUAD machine's handlebars by fasteners, e.g., four screws though mounting holes 430. The wires may be systematically coded and pinned to fit the existing wire harness.

Some of the front body parts on the ATV will need to be uninstalled to gain access to the front wires. Either the front left or right wheel will be removed. The wire harness will be connected as per instructions; in certain embodiments the instruction will be provided online. After installation, the removed wheel will be remounted back on the ATV and the body panels reinstalled. In certain embodiments, the mounting bracket 10 would not be needed and the unit can be mounted by other fasteners, such as zip-ties or elastic bungee cords. A speed sensor (not shown) can be mounted on either the right or left side.

Referring now to FIGS. 12 through 16, the present invention may include a clear or transparent plastic or plastic composite material used for an air box cover 510; an electrical system 520 for outputting light for the transparent air box cover lid 510; a clear or transparent plastic or plastic composite material used for intake/inlet valve cover lid 530; a clear or transparent plastic or plastic composite material used for exhaust/outlet valve cover lid 540; and a clear or transparent plastic or plastic composite material used for cylinder head side cam shaft/camshaft cover lid 550, wherein associated light output may be further included in the air box through an electrical system having pressure switches of the like. An allocated rubber seal gasket may be included for use on certain ATV/QUAD machines.

The intake, exhaust and camshaft clear covers 530, 540, and 550 are used together on a cylinder head to allow someone to visibly inspect the condition of internal parts and the condition of lubricants that are inside the motor without having the time to first remove such lids with tools.

The transparent and lighted air box lid may be used to allow someone to see the condition of the air filter without any obstruction, wherein the electrical system 520 may include connections and at least one pressure switch for enabling more light (for instance, through LEDs) for easier viewing.

Just the transparent air box lid will work by itself as it is an independent part, not needing any special tools or requirements or technique. For the transparent valve and camshaft covers, they are easily replaced with the new covers, replacing the gasket with one associated with the present invention.

The transparent and lighted clear air box cover 510 are also easily replaced by removing the air box screws 512 and placing the new air box lid, retightening the cover 10 with the supplied hardware.

To make the present invention, a manufacturer would need a special plastic forming machine with the correct tooling and mold that may only be performed by a CNC milling machine. The valve and camshaft covers and gaskets are required together to produce a proper seal for the lubricant to stay inside the motor while running.

Referring now to FIGS. 17 through 20, the present invention may include a plurality of carburetor air fuel mixture rich/lean screws 610, each air fuel mixture rich/lean screw having a spring 612, washer 630, and O-ring 614.

The washer 630 is seated on a threaded portion 640 along the stem 616 beneath a shank 620. Beneath the threaded portion 640 may be the O-ring 614. The washer 630 supports the spring 612. A stop 650 along the stem 616 may be present for the O-ring 614.

Figure 17:
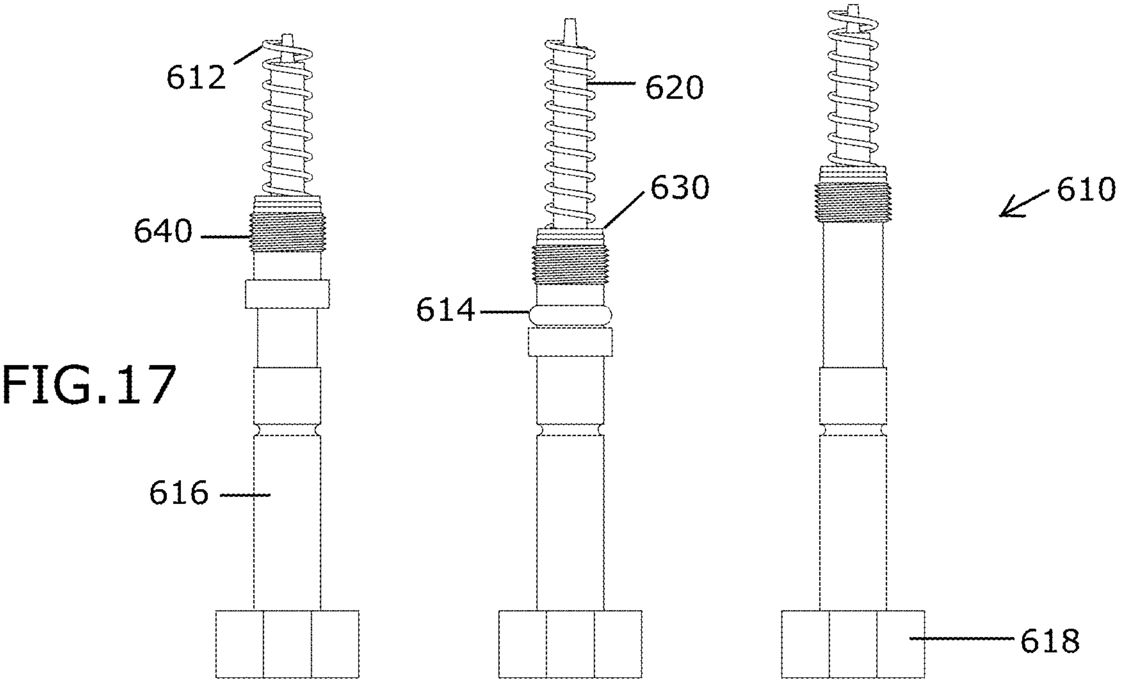
FIG. 17 is a perspective view of an exemplary embodiment of rich/lean screws of the present invention.
Figure 17A:
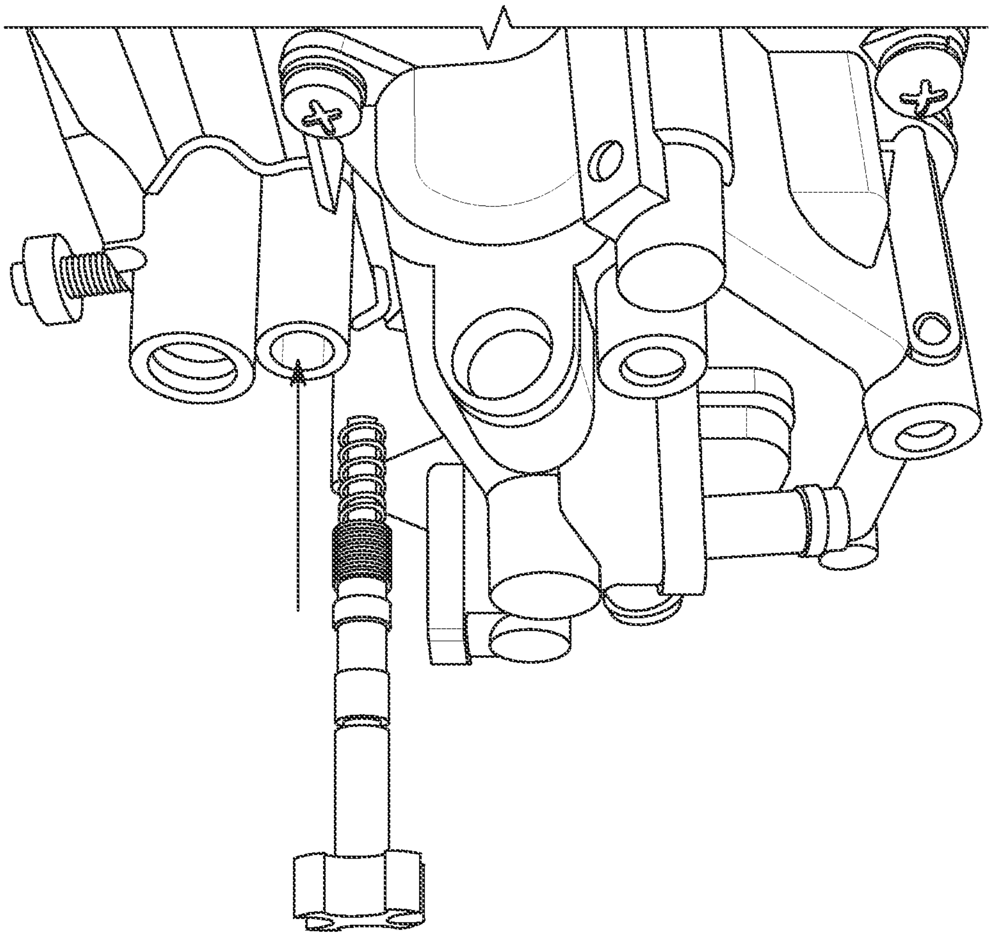
FIGS. 17A and 17B show the rich/lean screws of the present invention in use.
Figure 17B:
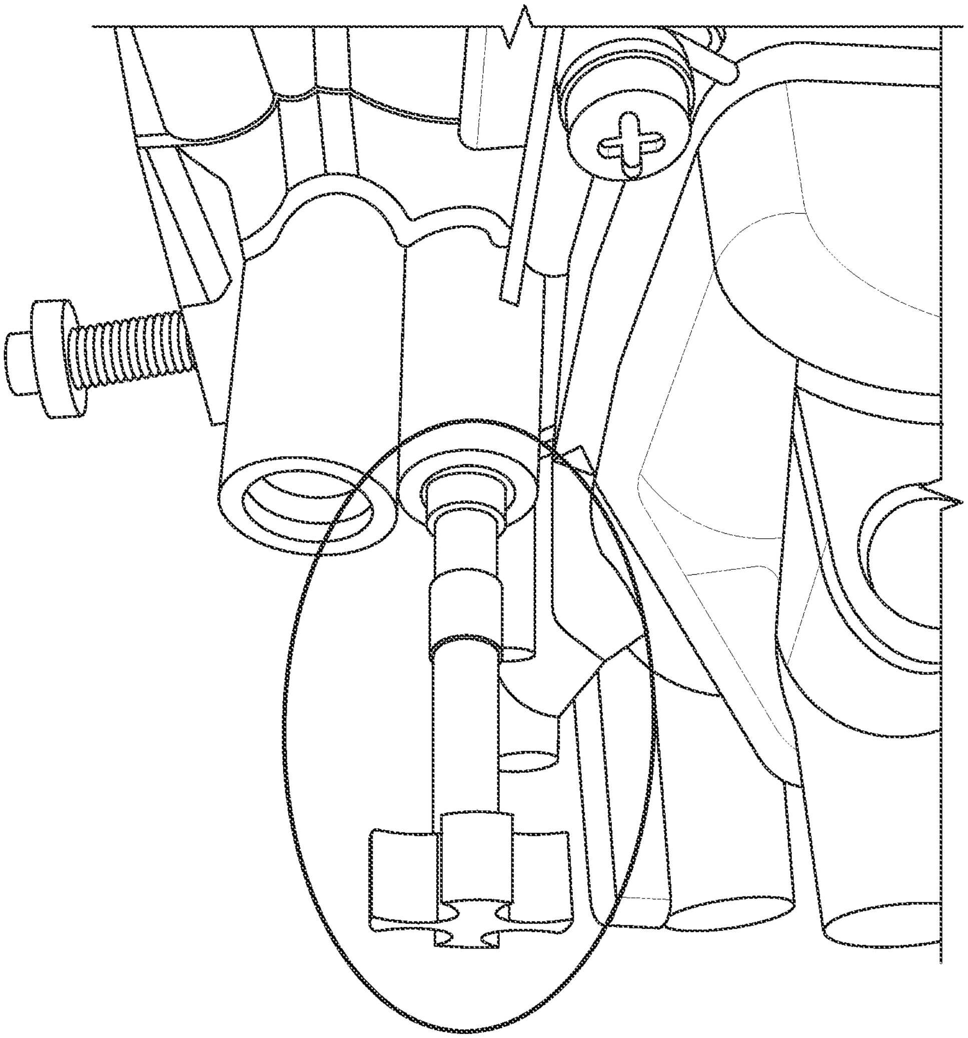
Figure 18:
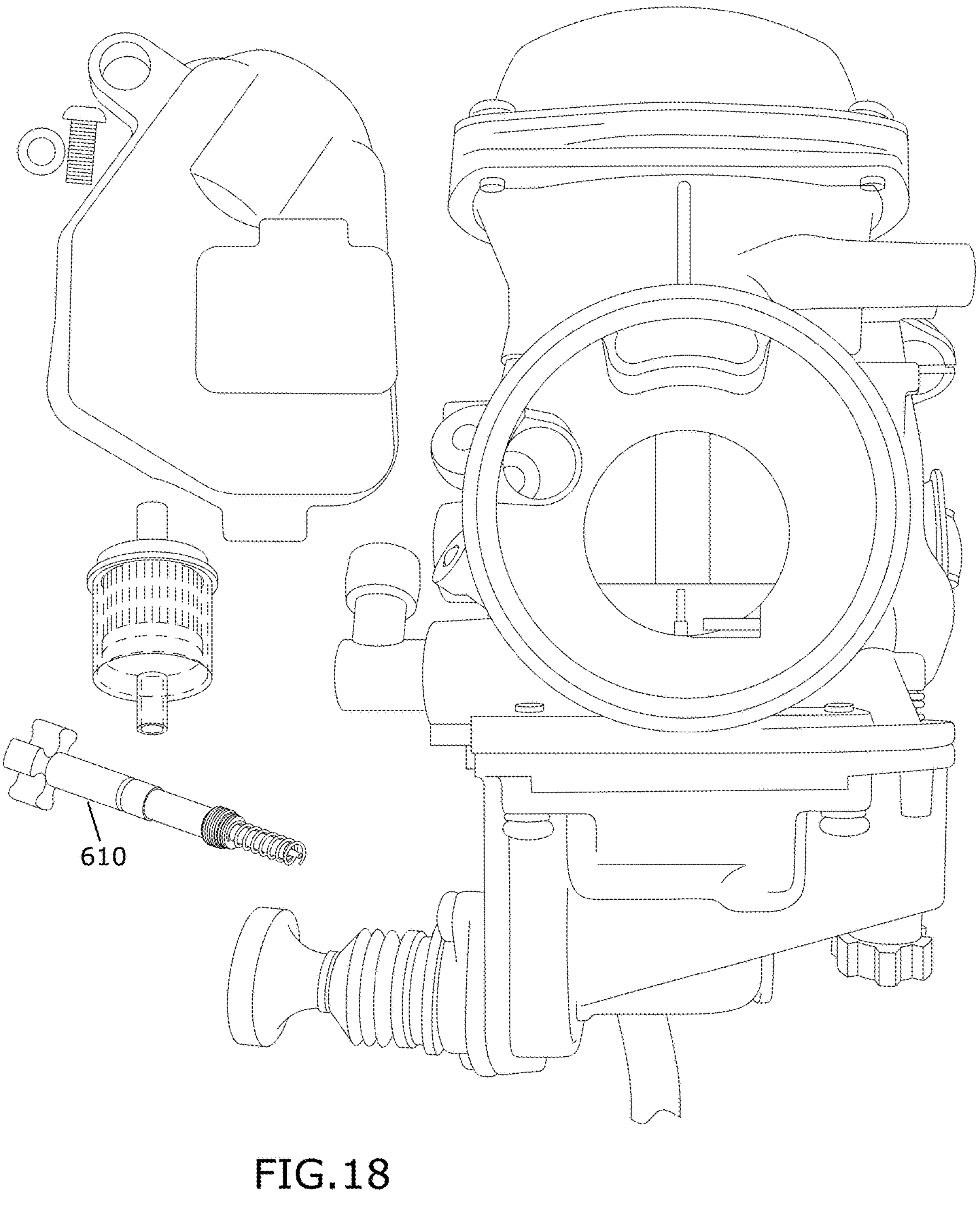
FIG. 18 shows various perspective views of an exemplary embodiment of the systemic components of the present invention.
Figure 19:
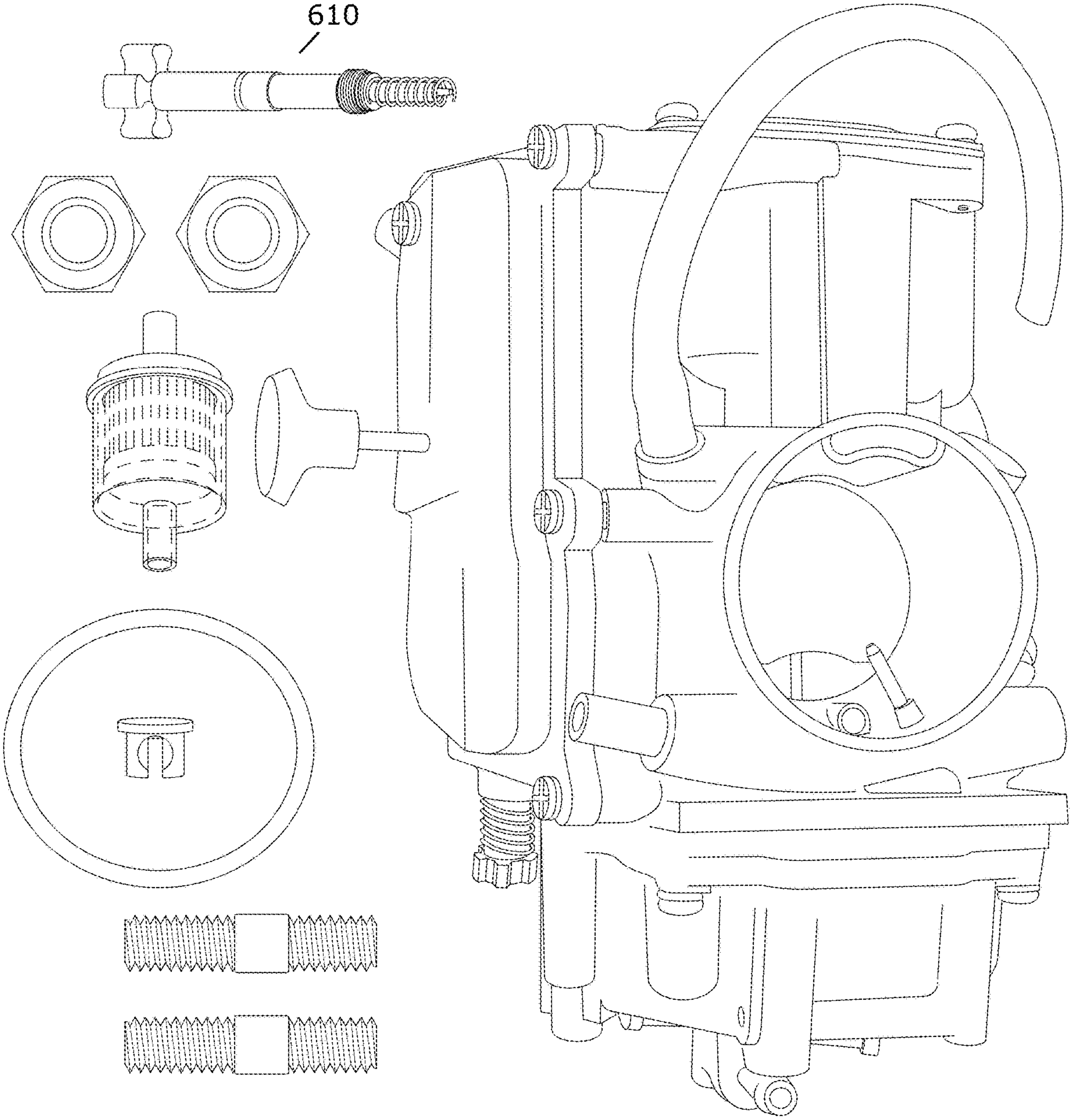
FIG. 19 shows various perspective views of an exemplary embodiment of the systemic components of the present invention.
Figure 20:
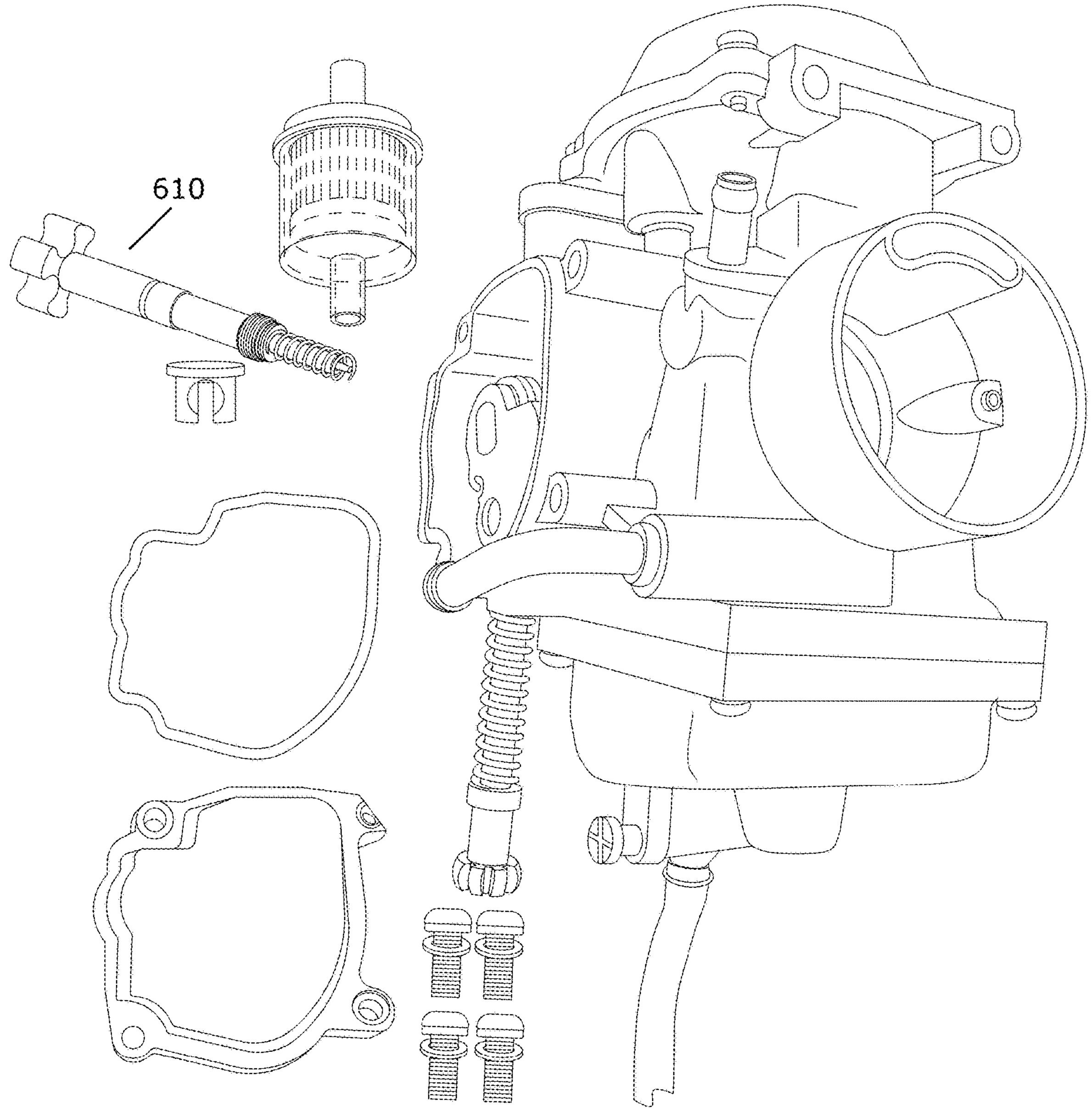
FIG. 20 shows various perspective views of an exemplary embodiment of the systemic components of the present invention.

In use, the shank 620 and spring 612 fits into the opening, as illustrated in FIGS. 17A and 17B, of the associated carburetor, until the O-ring 614 seals the opening where the screw fits, whereby the washer 630 pushes against the spring 612 ensuring tension. The stem 616 may terminate at a knob 618 providing a series of numbers spaced apart along a peripheral edge for identifying an associated carburetor.

A method of using the present invention may include the following. The carburetor air fuel mixture rich/lean screw 610 disclosed above may be provided. A user may unscrew the existing air fuel rich/lean screw, counting the amount of turns from tight. Then the user may place the new carburetor air fuel mixture rich/lean screw 610 therein, turning until the desired setting is reached.

It should be understood, of course, that the foregoing relates to exemplary embodiments of the invention and that modifications may be made without departing from the spirit and scope of the invention as set forth in the following claims.

What is claimed is:

1. A mounting bracket for a handlebar of an All-Terrain Vehicle (ATV), the mounting bracket comprising:

a U-shape body, wherein a lower portion of both legs of the U-shape body are tilted at an approximately thirty-degree degree angle relative to an upper portion of both legs of the mounting bracket, wherein the upper portion of both legs are substantially planar relative to a connecting portion of the U-shape body, the connecting portion connecting a proximal end for each upper portion, wherein a length of each of the upper and lower portions are at least one-half of each other, wherein a proximal end of each lower portion extends angularly from a distal end of each upper portion, respectively;

the connecting portion dimensioned and shaped to mount a tachometer between both legs;

an outer periphery of the connecting portion and the upper portions defines a U-shape; and a plurality of leg mounting holes only provided along said lower portions and not the upper portion of both legs.

2. The mounting bracket of claim 1, further comprising the tachometer connected to the connecting portion.

3. The mounting bracket of claim 2, wherein the tachometer provides an opening for a speed sensor.

4. The mounting bracket of claim 3, wherein connecting portion is spaced apart, by the upper portion for each leg, from all of the leg mounting holes so as to make the tachometer and the speed sensor visible over the handlebars.

5. The mounting bracket of claim 1, further comprising a plurality of tachometer mounting holes provided in the connecting portion and circumscribed by the outer periphery.

* * * * *